(12) United States Patent
Sugimoto et al.

(10) Patent No.: US 7,143,058 B2
(45) Date of Patent: Nov. 28, 2006

(54) NOTIFYING PROGRAM AND DETAILED STATEMENT DISPLAY METHOD

(75) Inventors: Naoshi Sugimoto, Minato (JP); Keishiro Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 10/079,412

(22) Filed: Feb. 22, 2002

(65) Prior Publication Data

US 2003/0023524 A1 Jan. 30, 2003

(30) Foreign Application Priority Data

Jul. 30, 2001 (JP) ............................. 2001-229943

(51) Int. Cl.
*G06F 17/30* (2006.01)
*G07F 7/00* (2006.01)

(52) U.S. Cl. ......................................... 705/27; 705/34
(58) Field of Classification Search ................. 705/27, 705/34
See application file for complete search history.

(56) References Cited

U.S. PATENT DOCUMENTS 5,903,881 A * 5/1999 Schrader et al. .............. 705/42
6,327,574 B1 * 12/2001 Kramer et al. ................ 705/14

FOREIGN PATENT DOCUMENTS

JP 2004071470 * 2/2003

OTHER PUBLICATIONS

Franzak, Frank et al., "Online relationships and the consumer's right to privacy", Journal of Consumer Marketing v18n7 pp. 631-649 2001.*

* cited by examiner

*Primary Examiner*—Michael Cuff
(74) *Attorney, Agent, or Firm*—Staas & Halsey LLP

(57) ABSTRACT

A detailed statement notifying system is connected via the Internet to a consumer terminal, a shop terminal, a credit company terminal and a logo management server. A detailed statement notifying program stored in the detailed statement notifying system is read by a CPU to obtain, when given a notification of consumer's transaction information from the credit company terminal, article information related to the consumer's transaction information from the shop terminal. The detailed statement notifying program further makes CPU obtain, when accessed from the consumer terminal, logo information of a maker of the article or a shop from a logo management server on the basis of the consumer's transaction information and the article information, generate data for displaying a detailed statement screen and transmit the data to the consumer terminal.

9 Claims, 30 Drawing Sheets

TRANSACTION MANAGEMENT DATABASE 62

SHOP MANAGEMENT DATABASE 63

FIG.9

LOGO MASTER TABLE 64

| LOGO ID | LOGO DATA | EFFECTIVE PERIOD | LOGO ADDRESS |
|---|---|---|---|
| NA000 | NA000.jpg | 1990.01.01~ | http://na.co.jp |
| SN000 | SN000.jpg | 1990.01.01~ | http://sn.co.jp |
| SN001 | SN001.jpg | 2001.05.01~2001.12.31 | http://sn.co.jp |
| XXX123 | XXX123.jpg | 2000.04.01~ | http://denki.co.jp |
| XXX124 | XXX124.jpg | 1999.10.01~ | http://hyakka.co.jp |

LOGO INFORMATION OBTAINING PROCESS SUBROUTINE

S221 ACCESS LOGO MANAGEMENT SERVER

S222 OBTAIN URL TO LOGO DATA FILE, EFFECTIVE PERIOD AND URL TO WEB PAGE

S223 WITHIN EFFECTIVE PERIOD? — NO

YES

S224 STORE CORRESPONDING URLs IN LOGO FIELD AND ADDRESS FIELD IN THE RECORD

S225 STORE DUMMY FILE URL IN LOGO FIELD IN THE RECORD

RETURN

FIG.19

DETAILED STATEMENT MANAGEMENT DATABASE 68

| USER ID | TRANSACTION DATE/TIME | MAKER ID | MAKER LOGO | MAKER LOGO ADDRESS | ARTICLE NAME | PRICE |
|---|---|---|---|---|---|---|
| U001 | 2001.05.01.1300 | NA000 | http://logo.co.jp/NA000.jpg | http://na.co.jp | AIR-CONDITIONER | 75,000 |
| U001 | 2001.05.01.1300 | TS000 | - | - | CLEANER | 25,000 |

FIG.21
 CONVENIENCE STORE "EIGHT", X-MACHI SHOP
(0559) 12-3456
PURCHASE DATA/TIME: 20:15, APRIL 29, 2001
| | | |
|---|---|---|
| 1  | GALICO ALMOND CHOCOLATE | ¥200 |
| 2  | HAYASHINAGA MILK 1L | ¥198 |
| 3  | ALBEE POTATO CHIPS | ¥128 |
| TOTAL (TAX EXCLUDED) | | ¥526 |

FIG.26

SALES MANAGEMENT DATABASE 91

| TRANSACTION ID | USER ID | TRANSACTION DATE/TIME | MAKER ID | MAKER NAME | MAKER LOGO | MAKER LOGO ADDRESS |
|---|---|---|---|---|---|---|
| 01501001 | U001 | 2001.05.01.1300 | NA000 | NASIRU | http://logo.co.jp/NA000.jpg | http://na.co.jp |
| 01501001 | U001 | 2001.05.01.1300 | TS000 | TOSAN | - | - |
| 01501002 | U596 | 2001.05.01.1540 | FJ000 | FUGE | - | - |
| 01501003 | U343 | 2001.05.01.2015 | HT000 | HOT | http://logo.co.jp/NA000.jpg | http://ht.co.jp |

| ARTICLE ID | ARTICLE NAME | PRICE | MAKER GUARANTY PERIOD |
|---|---|---|---|
| N543 | AIR-CONDITIONER | 75,000 | ONE YEAR |
| T987 | CLEANER | 25,000 | ONE YEAR |
| F123 | PERSONAL COMPUTER | 90,000 | ONE YEAR |
| H654 | LIGHT BULB | 350 | ONE YEAR |

FIG.28

TRANSACTION MANAGEMENT DATABASE 93

| TRANSACTION ID | USER ID | TRANSACTION DATE/TIME | SHOP ID | SHOP LOGO | SHOP LOGO ADDESS | CHARGED AMOUNT OF MONEY |
|---|---|---|---|---|---|---|
| 01501001 | U001 | 2001.05.01.1300 | XXX123 | http://logo.co.jp/XXX123.jpg | http://denki.co.jp | 100,000 |
| 01501002 | U596 | 2001.05.01.1540 | XXX123 | http://logo.co.jp/XXX123.jpg | http://denki.co.jp | 90,000 |
| x019876 | U782 | 2001.05.03.1835 | XXX124 | http://logo.co.jp/XXX124.jpg | http://hyakka.co.jp | 5,000 |

FIG.33

| FUJITSU MAIL-ORDER HOUSE | | | | | | | |
|---|---|---|---|---|---|---|---|
| BACK | FORWARD | STOP | RELOAD | HISTORY | PRINT | | |
| ADDRESS(D) | http //www | | | | | | GO |

ABC ELECTRIC COMPANY

TO: MR. TARO FIJUTSU

CUSTOMER NUMBER: 12345678

| TOTAL AMOUNT OF MONEY | MARCH 11, 2001 | 117,390 YEN |
|---|---|---|

{TRANSACTON DETAILED STATEMENT}

| TRANSACTION DATE | SLIP CODE | ABSTRACT | MAKER GUARANTY PERIOD | PRICE |
|---|---|---|---|---|
| 2001/03/11 | ABC-000001 | ZONY VIDEO DECK AX123 | ZONY<br>ONE YEAR | 39,800 |
| 2001/03/11 | ABC-000002 | FUJITSU GENERAL AIR-CONDITIONER AS2BGPY | FUJITSU GENERAL<br>ONE YEAR | 72,000 |
| | | | SUBTOTAL | 111,800 |
| | | | SALES TAX | 5,590 |
| | | | TOTAL | 117,390 |

4a

NOTIFYING PROGRAM AND DETAILED STATEMENT DISPLAY METHOD

BACKGROUND OF THE INVENTION

1. Field of the Invention

The present invention relates to a detailed statement notifying method of notifying a consumer terminal of a detailed statement which is a record of a commercial transaction made by the consumer, a detailed statement notifying program executed by a computer connected to the consumer terminal to practice the detailed statement notifying method, and a detailed statement display method of displaying the detailed statement by receiving the detailed statement from a system executing the detailed statement notifying method.

2. Description of the Related Art

When a consumer establishing a contract with a credit card company for using a credit card purchases something at a convenience store or a supermarket, a payment detailed statement serving as a receipt is handed over to the consumer. Further, a monthly payment detailed statement is sent per month to the consumer. Moreover, if the consumer requests a public institution imposing a public utility charge such as a tax for a service of correcting the public utility charge imposed on the consumer himself or herself directly from the consumer's bank account, a detailed statement of the payment of the public utility charge, i.e., a name of the public institution receiving the public utility charge and an amount of money thereof are entered in the bankbook with the same bank account, which may be categorized as a kind of detailed statement of the payment. Further, a service enabling the consumer to confirm on a Web screen the consumer's payment detailed statement as described above, is recently on the commencement.

The respective items are, however, described in smaller characters in the payment detailed statement and on the Web screen, and the consumer is therefore hard to discern between the respective items. Further, a shop name in a payment detailed statement occurred when using the credit card in a foreign country, is written in their native language, and the consumer is therefore unable to grasp a content of the detailed statement at once simply by seeing the payment detailed statement.

SUMMARY OF THE INVENTION

It is a primary object of the present invention, which was devised under such circumstances, to provide a detailed statement notifying method capable of visually notifying a consumer of a detailed statement as a record of a transaction made by the consumer, a detailed statement notifying program read in by a computer's communicable with a consumer terminal to execute the detailed statement notifying method, and a detailed statement display method for displaying the detailed statement as the record of the transaction made by the consumer.

One aspect of the present invention is a detailed statement notifying method for transmitting information on a detailed statement about a transaction to a consumer terminal of a consumer who makes a transaction with another party. The method includes a step of storing transaction information on each transaction between the consumer and another party, a step of obtaining logo information on a mark utilized by a party concerned with the transaction on the basis of the transaction information, a step of generating detailed statement information containing a mapping of the logo information to the transaction information, and a step of transmitting the detailed statement information to the consumer terminal.

In case the detailed statement notifying method is executed, the detailed statement information containing the mapping of the transaction information to the logo information is transmitted to the consumer terminal, whereby the consumer terminal comes to be capable of displaying the screen containing the detailed statement information. Then, when the consumer displays this screen by operating the consumer's own terminal, the mark based on the logo information is displayed in a state where it corresponds to the transaction information. Accordingly, the consumer who sees this screen can instantaneously comprehend the content of the detailed statement.

It is to be noted that the logo information may contain a piece of information on the mark utilized for the business purpose by the trader himself or herself having the transaction with the consumer, and may contain a piece of information on a mark utilized for the business purpose by a manufacturer of the article purchased by the consumer, and further may contain both of these pieces of information.

According to the aspect of the present invention, there is also provided a detailed statement notifying program read by a computer communicable with a consumer terminal of a consumer who makes a transaction with another party. The program makes the computer obtain logo information on a mark utilized by a party concerned with the transaction on the basis of transaction information on the transaction, generate detailed statement information containing a mapping of the logo information to the transaction information, and transmit the detailed statement information to the consumer terminal.

Hence, this detailed statement notifying program enables the computer communicable with the consumer terminal to function as a system to which the detailed statement notifying method of the present invention is applied.

According to another aspect of the present invention, a detailed statement display method for displaying information about a transaction between a consumer and another party. The method includes a step of storing, when receiving transaction information on each transaction between the consumer and another party and logo information on a mark utilized by a party concerned with the transaction, the same transaction information and logo information, a step of generating a detailed statement screen showing a mapping of the transaction information to the logo information, and a step of displaying the generated detailed statement screen.

Accordingly, this detailed statement display method enables the computer to function as a system for displaying the detailed statement information on the basis of the information given from the system to which the above detailed statement notifying method is applied.

BRIEF DESCRIPTION OF THE DRAWINGS

The invention will be described below in detail with reference to the accompanying drawings, in which:

FIG. 9 is a table showing a data structure of a logo master table stored in the logo management server;

FIG. 19 is a table showing a data structure of a detailed statement management database stored in the shop terminal;

FIG. 21 is a diagram showing a detailed statement screen generated on the shop terminal;

FIG. 26 is a table showing a data structure of a sales management database stored in the shop terminal;

FIG. 28 is a table showing a data structure of a transaction management database stored in the credit card company terminal;

FIG. 33 is a diagram showing a detailed statement screen displayed on the display of the consumer terminal.

DESCRIPTION OF THE PREFERRED EMBODIMENTS

Embodiments of the present invention will hereinafter be described with reference to the accompanying drawings.

FIRST EMBODIMENT

Figure 1:
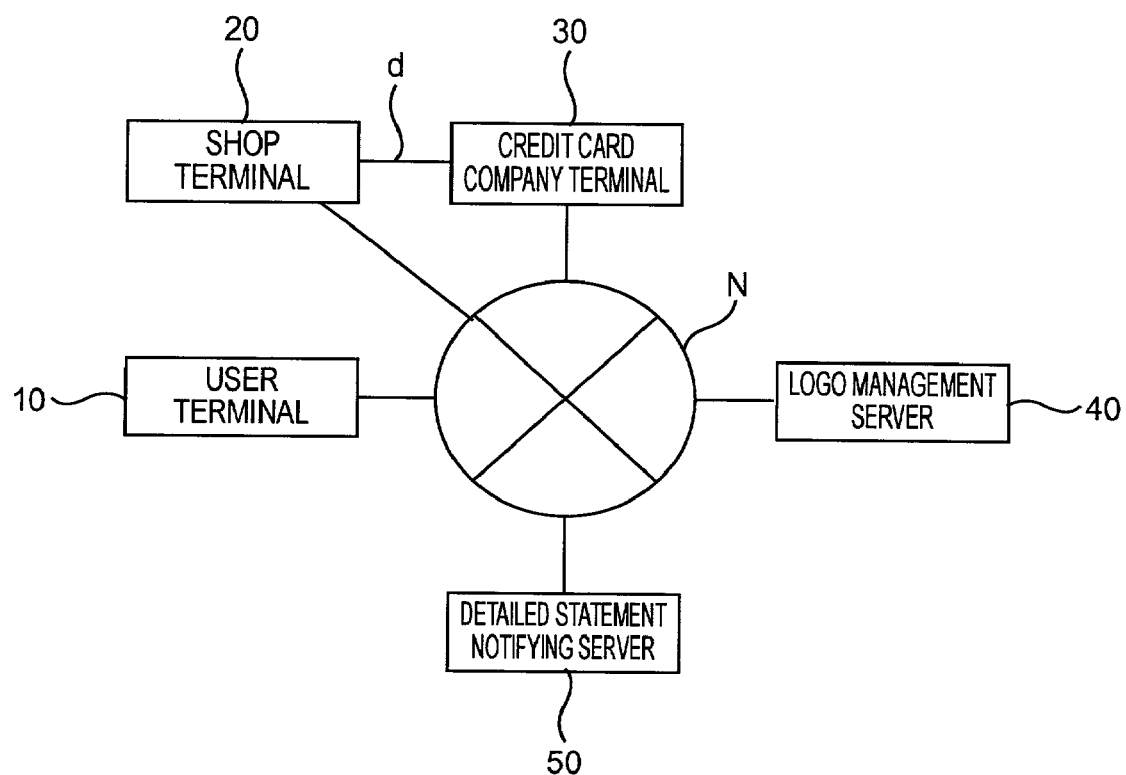
FIG. 1 is a block diagram schematically showing an architecture of a whole system in a first embodiment.

FIG. 1 schematically showing a system architecture of a whole computer network system as a first embodiment of a present invention to which a detailed statement notifying system according to the present invention is applied. As shown in FIG. 1, the computer network system in the first embodiment is configured by a consumer terminal 10 operated by a consumer, a shop terminal 20 installed in a sales shop, a credit card company terminal 30 installed in a credit card company, a logo management server 40, and a detailed statement notifying server 50 defined as the detailed statement notifying system, all these terminals and servers being connected to each other via the Internet N.

Figure 2:
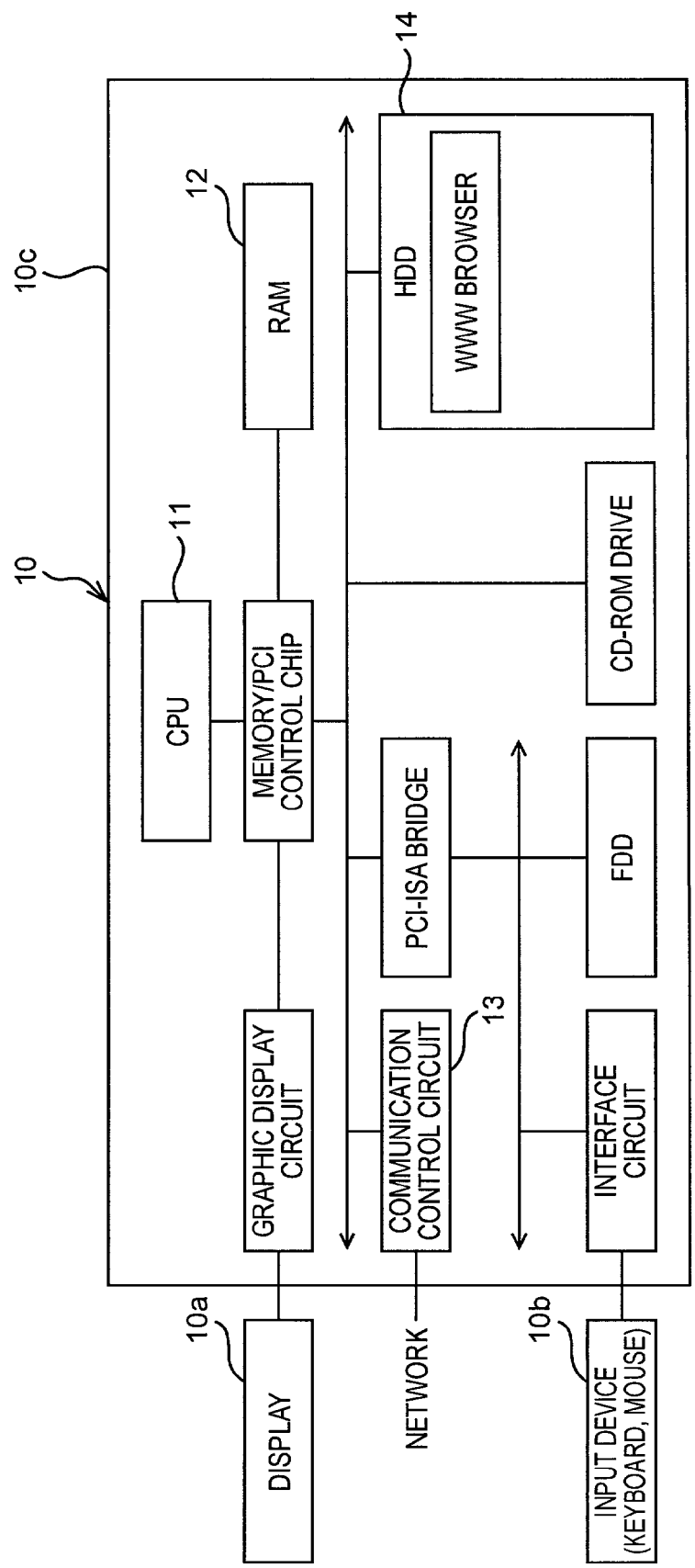
FIG. 2 is a block diagram schematically showing an architecture of a consumer terminal.

The consumer terminal 10 is generally a commercially available computer with a communication function such as a desktop type, notebook type and handheld computer, a mobile telephone having an Internet access function and so on. FIG. 2 schematically shows a hardware architecture of this consumer terminal. As shown in FIG. 2, the consumer terminal 10 includes a display 10a for displaying a variety of screens, an input device 10b such as a keyboard, a mouse and so forth, and a main unit 10c connected to the display 10 and the input device 10b. The main unit 10c includes pieces of hardware as main components, i.e., a CPU 11, a RAM 12, a communication control circuit 13 and an HDD 14.

The CPU 11 is a central processing unit for controlling the whole device including the hardware components 12 through 14. The RAM 12 is a Random Access Memory, for caching various categories of programs read by the CPU 11, on which an operation area for the CPU 11 is developed. The communication control circuit 13 may be a network adapter, a modem, a DSU (digital Service Unit), and a NIC (Network Interface Card) connected to the Internet N via a communication lien such as a telephone line, a LAN (Local area Network) and so on. This communication control circuit 13 controls data transmissions and receipts between the computers connected to the Internet N.

The HDD 14 is stored with an application program executed by the CPU 11 to actualize a variety of functions, data used in processes executed by the CPU 11, and an OS (operating System) program running on the CPU 11 so that the CPU 11 executes a system administration such as an execution management of the application program and a network administration.

Note that the application program stored in the HDD 14 contains information browsing software known as a WWW (World Wide Web) Browser. A function of this WWW Browser is that when a URL (Uniform Resource Locator) is inputted from the input device 10b in a state of its being executed by the CPU 11, the CPU 11 accesses a WWW server specified (located) by this URL, requests the server for data (file) in a URL-hyperlinked data storage location, reads in a hypertext formatted file described in HTML (HyperText Markup Language), and displays a Web page indicated by data in this file on the display 10a. Note that the data is read in according to a communication protocol such as TCP/IP (Transmission control Protocol/Internet Protocol) and HTTP (HyperText Transfer Protocol).

Figure 3:
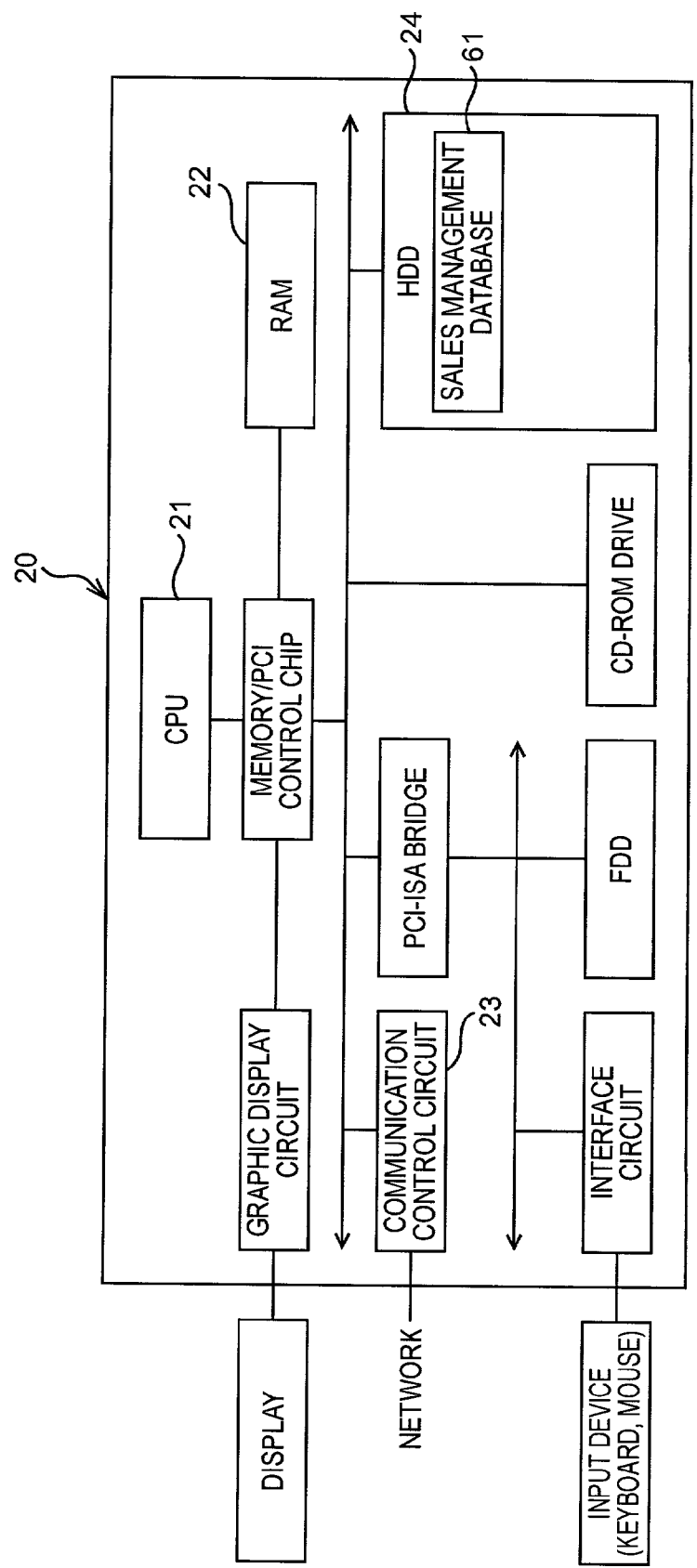
FIG. 3 is a block diagram schematically showing an architecture of a shop terminal.
Figure 4:
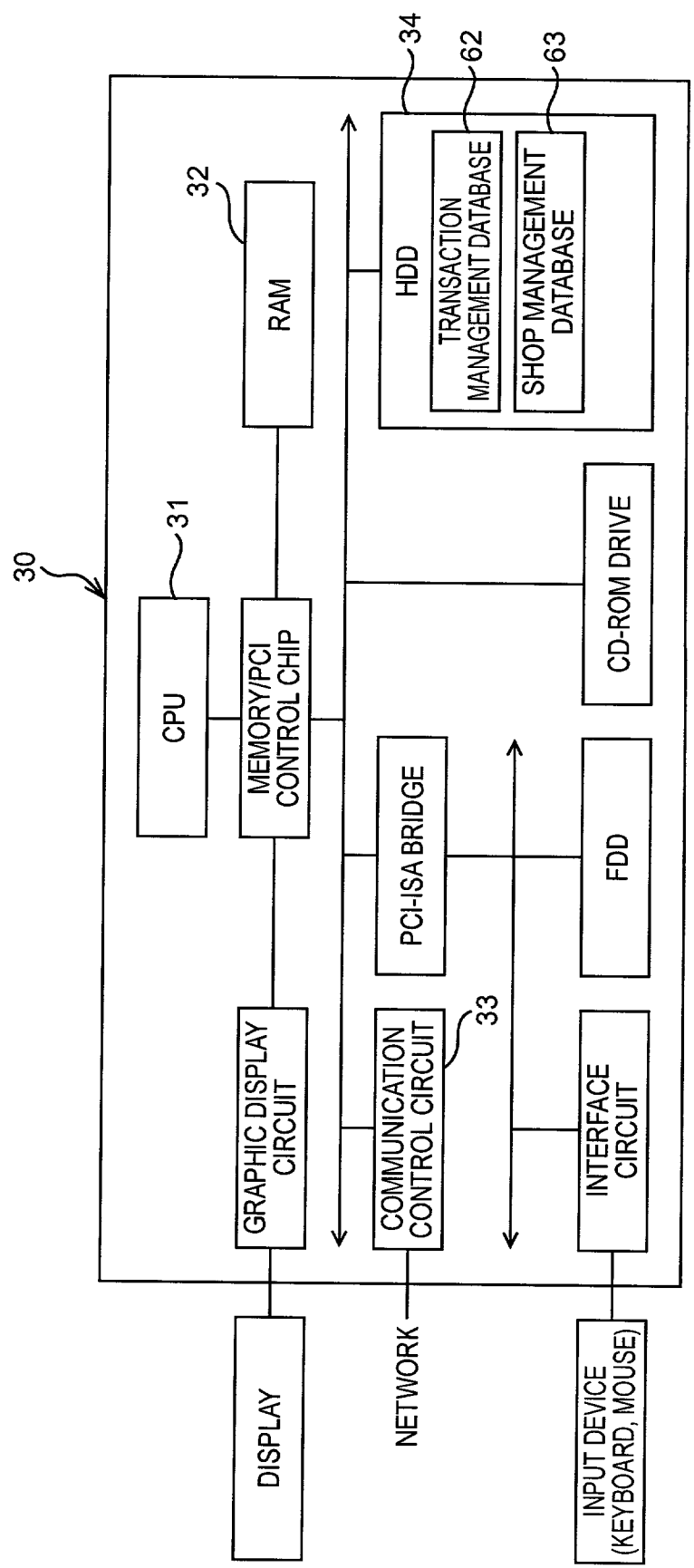
FIG. 4 is a block diagram schematically showing an architecture of a credit card company terminal.
Figure 5:
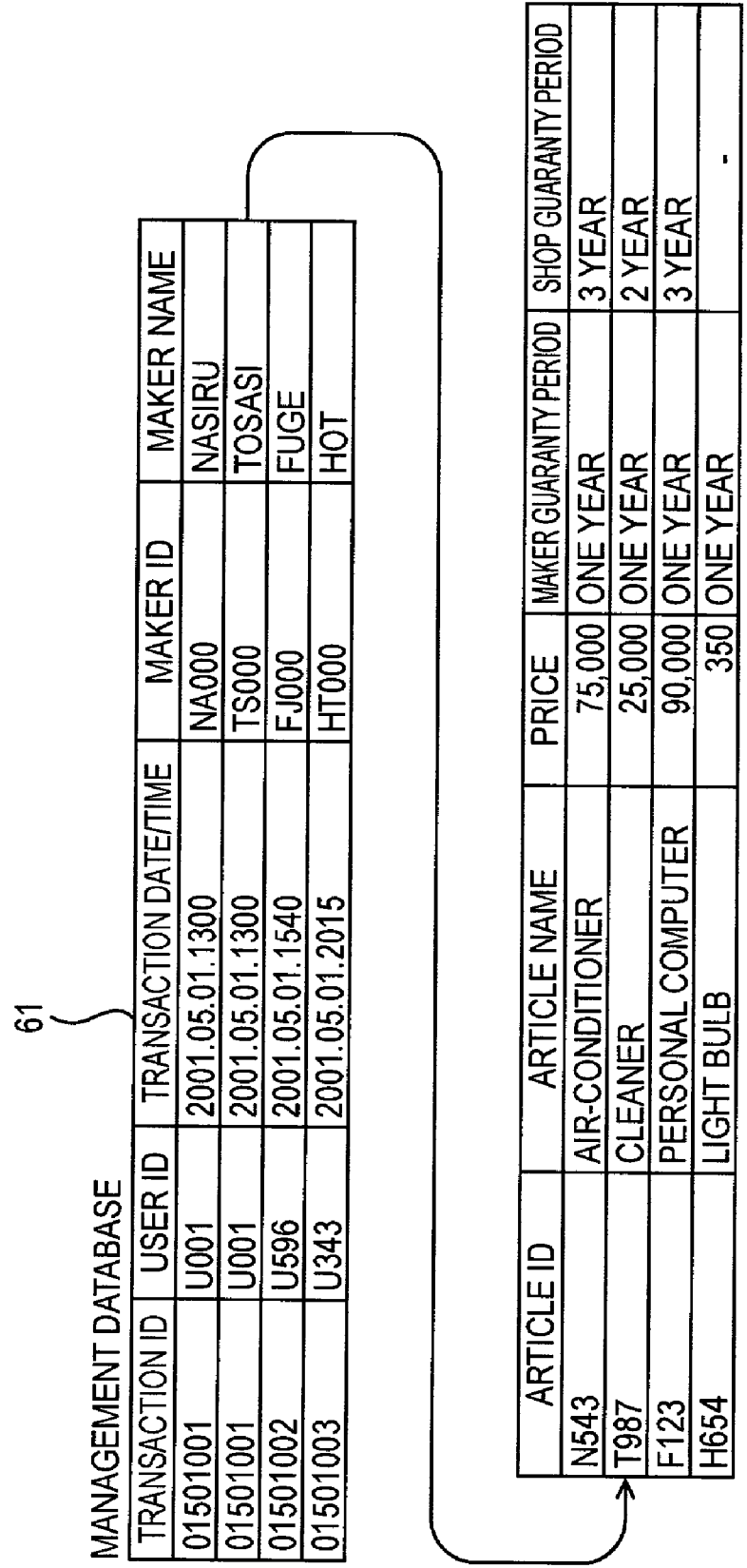
FIG. 5 is a table showing a data structure of a sales management database stored in the shop terminal.

The shop terminal 20 and the credit company terminal 30 are also in general, as in the case of the consumer terminal 10, the commercially available computers each having the communication function. FIG. 3 schematically illustrates an architecture of the shop terminal 20. FIG. 4 schematically shows an architecture of the credit company terminal 30. As shown in FIGS. 3 and 4, the terminals 20, 30 include, as main components, pieces of hardware such as CPUs 21, 31, RAMs 22, 32, communication control circuits 23, 33 and HDDS 24, 34. Note that the hardware components 21 to 24 and 31 to 34 have the same functions as those shown in FIG. 2, and hence their repetitive explanations are omitted. These HDDs 24, 34 do not, however, implement the WWW Browser. The HDD 24 is stored with a sales management database 61, and the HDD 34 is stored with a transaction management database 62 and a shop management database 63. FIGS. 5 trough 7 show one examples of data structures of the databases 61 to 63.

The sales management database 61 stored in the HDD 24 of the shop terminal 20, as shown in FIG. 5, contains a record of data entered in a "transaction ID" field, a "consumer ID" field, a "transaction date/time" field, a "maker ID" field, a "name of maker" field, an "article ID" field, a "price" field, a "maker guaranty period" field and a "shop guaranty period" field with respect to every commercial article purchased by the consumer.

The "transaction ID" field is registered with a settlement identification number, that is number unique to a transaction, defined by the credit card company each time the consumer settles an account (payment) with his or her credit card. Note that a plurality of articles purchased in one settlement (payment) by the consumer at the shop are given the same settlement identification number. The "consumer ID" field is registered with consumer (user) identifying information defined by the credit card company to identify the individual consumer. The "transaction date/time" field is a field registered with a settlement date/time i.e., the year, month, date and time when the consumer purchased the article and settled the account. The "maker ID" field is registered with maker identifying information for identifying the individual maker. The "name of maker" field is registered with a name of the maker. The "article ID" field is registered with article identifying information for identifying a category of each article. The "name of article" field is registered with a name of the article purchased by the consumer. The "price" field is registered with a price of the article bought by the consumer. The "maker guaranty period" field is registered with a maker guaranty period that is a fixed period counted from the purchase date, during which the maker guarantees a charge-free repair of the article. The "shop guaranty period" field is registered with a shop guaranty period that is a fixed period counted from the purchase date, during which the shop from which the consumer purchased the article guarantees a charge-free repair of this article.

Figure 6:
FIG. 6 is a table showing a data structure of a transaction management database stored in the credit card company terminal.

The transaction management database 62 stored in the HDD 34 of the credit card company terminal 30, as shown in FIG. 6, contains a record of data entered in a "transaction ID" field, a "consumer ID" field, a "transaction date/time" field, a "shop ID" field and a "claimed amount of money" field with respect to every settlement identification number.

The "transaction ID", "consumer ID" and "transaction date/time" fields are registered with a settlement identification number, a consumer identification number and a settlement date/time that correspond to the respective items in the sales management database 61. The "shop ID" field is registered with shop identifying information for identifying an individual shop where the transaction was made. Note that this "shop ID" field corresponds to the same named field in the shop management database 63 that will be described later on. The "claimed amount of money" field is registered with an amount of money settled with the credit card when the consumer has purchased the article. It is to be noted that this settled amount of money is a total amount of prices of these articles in case the consumer bought the plurality of articles in one settlement (payment). The settled total amount of money may include due amounts of taxes and other fees together with the prices of the articles.

Figure 7:
FIG. 7 is a table showing a data structure of a shop management database stored in the credit card company terminal.

The shop management database 63 stored in the HDD 34 of the credit card company terminal 30 contains, as shown in FIG. 7, a record of data entered in a "shop ID" field, a "name of shop" field and a "shop address" field with respect to every shop. The "shop ID" field is registered with shop identifying information. The "name of shop" field is registered with a name of each shop. The "shop address" field is registered with an IP address defined for the shop terminal 20 installed in each shop.

Note that the shop terminal 20 is, as shown in FIG. 1, connected to the credit card company terminal 30 via a leased line d, through which information as to use of the credit card is transmitted between the shop terminal 20 and the credit card company terminal 30 whenever a credit card issued by the credit card company is used at the shop. Note that this type of card settlement system is generally utilized and is, though its detailed explanation is omitted, outlined as below.

When the consumer's own credit card is read with a card reader on the occasion of the consumer's settling the account at the shop, the consumer identifying number recorded on this card, the shop identifying information allocated to the shop and a total amount of prices of the articles purchased by this consumer, are transmitted to the credit card company terminal 30 via the leased line d. Then, this total amount is registered as a settled amount of money in the "claimed amount of money" field of the transaction management database 62 if it does not exceed an amount that can be financed to this consumer. Then, the settlement identification number defined for this settlement is registered in the "transaction ID" field, the received consumer identifying number is registered in the "consumer ID" field, the settlement date/time is registered in the "transaction date/time" field, and the received shop identifying information is registered in the "shop ID" field. After these registrations, the credit card company terminal 30 transmits the settlement identification number and the settlement date/time back to the shop terminal via the leased line d. Then, the shop terminal 20 receiving the settlement identification number and the settlement date/time registers the same settlement identification number and settlement date/time in the "transaction ID" field and the "transaction date/time" field of the sales management database 61. Further, the consumer identifying number read by the reader is registered in the "consumer ID" field, and the article identifying information of the article purchased by the consumer, the name of this article, the maker identifying information of the maker that manufactures the same article and the name of this maker, are registered in the "article ID" field, the "name of article" field, the "maker ID" field and the "name of maker" field, respectively.

Figure 8:
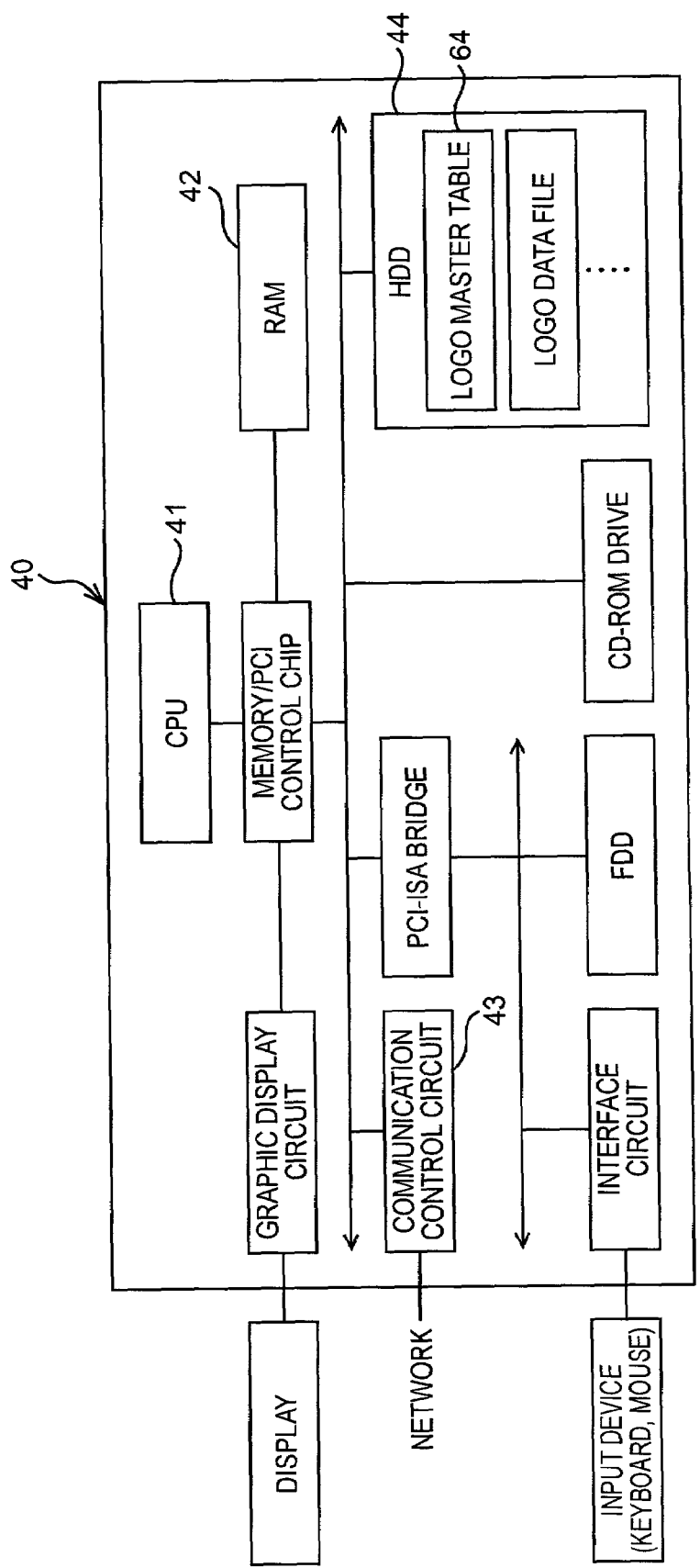
FIG. 8 is a block diagram schematically showing an architecture of a logo management server.

The logo management server 40 is a computer for sending, when accessed from the detailed statement notifying server 50 that will be explained later on, a predetermined piece of information back to the server 50. FIG. 8 schematically shows an architecture of this logo management server 40. As shown in FIG. 8, the logo management server 40 includes, as main components, pieces of hardware such as a CPU 41, a RAM 42, a communication control circuit 43, an HDD 44 and so on. Note that the hardware components 41 through 44 have the same functions as those shown in FIG. 2, and hence their repetitive explanations are omitted. The HDD 44 of the logo management server 40 is not, however, installed with the WWW Browser described above. The HDD 44 is stored with a plurality of logo data files respectively containing image data of marks (which are hereinafter referred to as "logos") used by the shops or the makers for their business purposes, and also with a logo master table 64. FIG. 9 shows one example of a data structure of this logo master table 64.

As shown in FIG. 9, the logo master table 64 contains a record of data entered in a "logo ID" field, a "logo data" field, an "effective period and a logo address" with respect to every "logo ID". The "logo ID" field is registered with the shop or maker identifying information described above. The "logo data" field is registered with a file name of the logo data file corresponding to the shop or maker identifying information. The "effective period" field is registered with an effective period of the logo that is defined by the shop or the maker identified by the shop or maker identifying information. The "logo address" field is registered with a URL to a Web page provided on the Internet N by the shop or the maker identified by the shop or maker identifying information.

Figure 10:
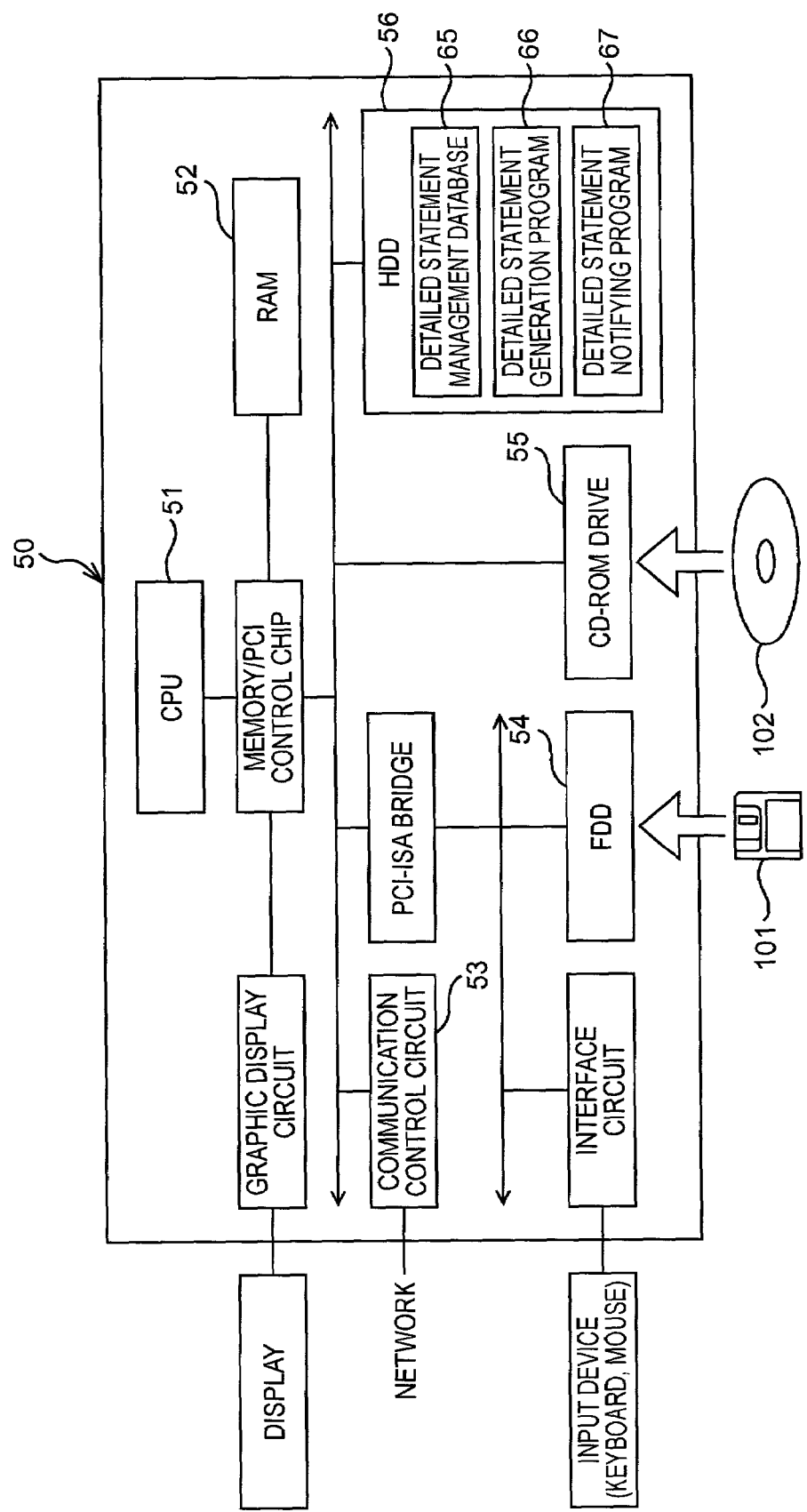
FIG. 10 is a block diagram schematically showing an architecture of a detailed statement notifying server.

The detailed statement notifying server 50 is a computer functioning as a Web server for sending, upon an access from the terminal on the Internet N, the data of the predetermined Web page back to this terminal. FIG. 10 schematically shows an architecture of this detailed statement notifying server 50. As shown in FIG. 10, the detailed statement notifying server 50 includes, as main components, pieces of hardware such as a CPU 51, a RAM 52, a communication control circuit 53, a FDD 54, a CD-ROM drive 55, an HDD 56 and so forth. Note that the CPU 51, the RAM 52 and the communication control circuit 53 have the same functions as those shown in FIG. 2, and hence their repetitive descriptions are omitted.

The FDD 54 and the CD-ROM drive 55 are respectively loaded with a flexible disk 101 and a CD-ROM 102 which are stored with a variety of program and data or their version-ups to read the programs and data from the flexible disk 101 and the CD-ROM 102. Thus read programs and data are installed in the HDD 56.

The HDD (corresponding to a storage unit) 56 is stored with an application program executed by the CPU 11 to actualize a variety of functions, the data used in processes executed by the CPU 11, the OS program running on the CPU 11 so that the CPU 11 executes a system administration such as an execution management of the application program and a network administration, and various items of data as well.

Note that the data stored in this HDD56 include a plurality of hypertext files containing Web page data as various categories of contents. URLs are allocated to the storage locations of these hypertext files, and the hypertext file is transferred in response to an indication from the CPU 51 to the terminal accessing thereto with specifying the URL hyperlinked to the storage location. Note that each of the Web pages may be provided with a tool button (icon) with any one of URLs set as a link address. When the tool button on the Web page displayed on a display of any one of the terminals is clicked, the WWW Browser running on the terminal functions to deliver a request message specifying the URL embedded in the tool button.

Figure 11:
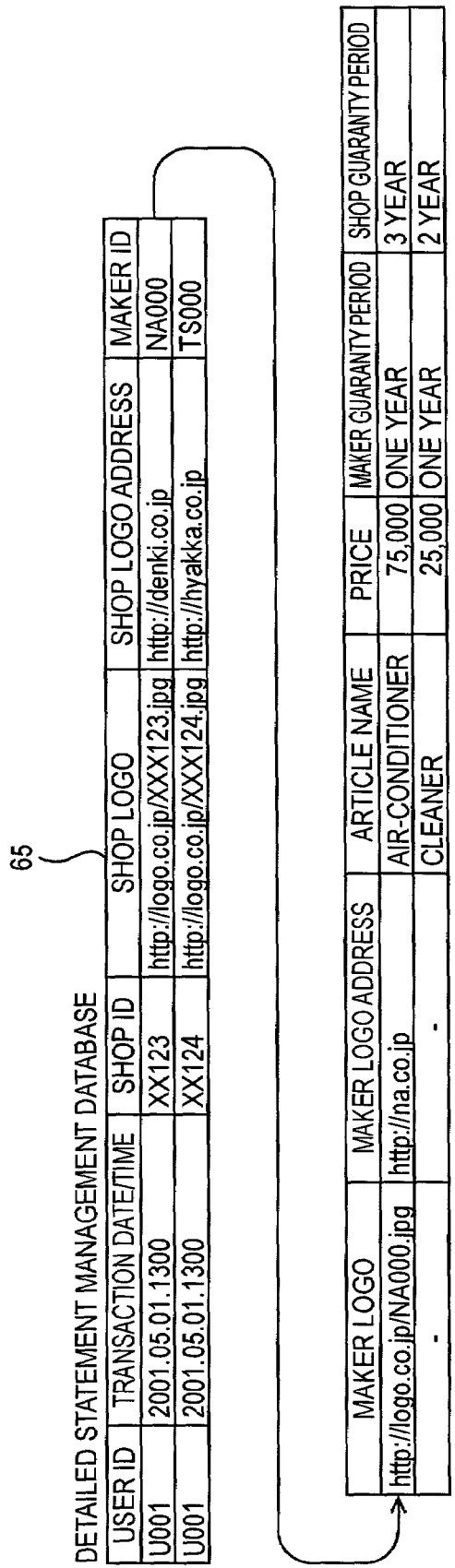
FIG. 11 is a table showing a data structure of a detailed statement management database stored in the detailed statement notifying server.

Further, this HDD 56 is stored with a detailed statement management database 65. FIG. 11 shows one example of a data structure of the detailed statement management database 65. As shown in FIG. 11, the detailed statement management database 65 contains a record of data entered in a "consumer ID" field, a "transaction date/time" field, a "shop ID" field, a "shop logo" field, a "shop logo address" field, a "maker ID" field, a "maker logo" field, a "maker logo address" field, a "name of article" field, a "price" field, a "maker guaranty period" field and a "shop guaranty period" field with respect to every article purchased by the consumer.

The "consumer ID" field, the "transaction date/time" field, the "shop ID" field, the "maker ID" field, the "name of article" field, the "price" field, the "maker guaranty period" field and the "shop guaranty period" field, are registered with a piece of consumer identifying information, a settlement date/time, shop identifying information, maker identifying information, a name of the article, a price, a maker guaranty period and a shop guaranty period, respectively. Note that these data fields correspond to those in the sales management database 61 and in the transaction management database 62. The "shop logo" field is registered with a URL as an address of a storage location of a logo data file in the logo management server 40, which contains image data showing the logo of the shop identified by the shop identifying information. The "shop logo address" field is registered with a URL of a Web page provided on the Internet N by the shop identified by the shop identifying information. The "maker logo" field is registered with a URL as an address of a storage location of a logo data file in the logo management server 40, which contains image data showing the logo of the maker identified by the maker identifying information. The "maker logo address" field is registered with a URL of a Web page provided on the Internet N by the maker identified by the maker identifying information. Note that the "shop ID" field, the "shop logo" field, the "shop logo address" field, the "maker ID" field, the "maker logo" field and the "maker logo address" respectively correspond to those in the logo master table 64. Further, various categories of information are temporarily written to the "shop logo" field, the "shop logo address" field, the "maker logo" field and the "maker logo address" field only for the duration of an execution of a detailed statement notifying program 67 that will be explained later on.

Moreover, the HDD 56 is stored with a detailed statement generation program 66 and the detailed statement notifying program 67 (corresponding to a logo information acquisition module, a detailed statement generation module and a transmission module).

The detailed statement generation program 66 makes the CPU 51 obtain pieces of article information (maker identifying information, a name of the article, a price, a maker guaranty period and a shop guaranty period) corresponding to a settlement identifying number and a transaction date/time from the shop terminal 20 on the basis of pieces of transaction information (the settlement identification number, consumer identifying information and shop identifying information) transmitted from the credit company terminal 30 and a shop IP address, and add a record consisting of the respective pieces of information excluding the settlement identification number to the detailed statement management database 65.

When accessed from the consumer terminal 10, the detailed statement notifying program 67 makes the CPU 51 extract the record containing the settlement date/time within a period specified by the consumer who operates the consumer terminal 10 from the detailed statement management database 65, obtain pieces of logo information (URL as the address of the storage location of the logo data file and URL to a Web page provided by the shop or the maker) corresponding to the shop identifying information and the maker identifying information in the extracted record form the log management server 40, generate pieces of data of a detailed statement screen (see FIG. 15) showing the information about the detailed statement for the consumer on the basis of the transaction information (the consumer identifying information, the shop identifying information and the article information) and the logo information, and transmit the thus generated data to the consumer terminal 10.

Given next is an explanation of processes executed in the computer network system having thus explained system architecture.

Whenever a consumer purchases an article at a shop and settles the account by using a credit card, as discussed above, the record of the transaction made by the consumer is accumulated in the sales management database 61 of the shop terminal 20 and in the transaction management database 62 of the credit company terminal 30. The credit company terminal 30 executes a process of periodically (at an interval of, e.g., one month) notifying the detailed statement notifying server 50 of the accumulated pieces of transaction information (the settlement identification number, the consumer identifying information and the shop identifying information) and an IP address of the shop terminal 20 of the shop identified by the shop identification number.

To be specific, the credit company terminal 30 executes a process of reading the records of the transaction information one by one from the transaction management database 62, and reading from the shop management database 63 the IP address of the shop terminal 20 identified by the shop identifying information contained in the thus read transaction information. Then, the credit company terminal 30 executes a process of generating and storing a record consisting of the transaction information and the IP address in a transfer file, and transmitting this transfer file to the detailed statement notifying server 50.

Figure 12:
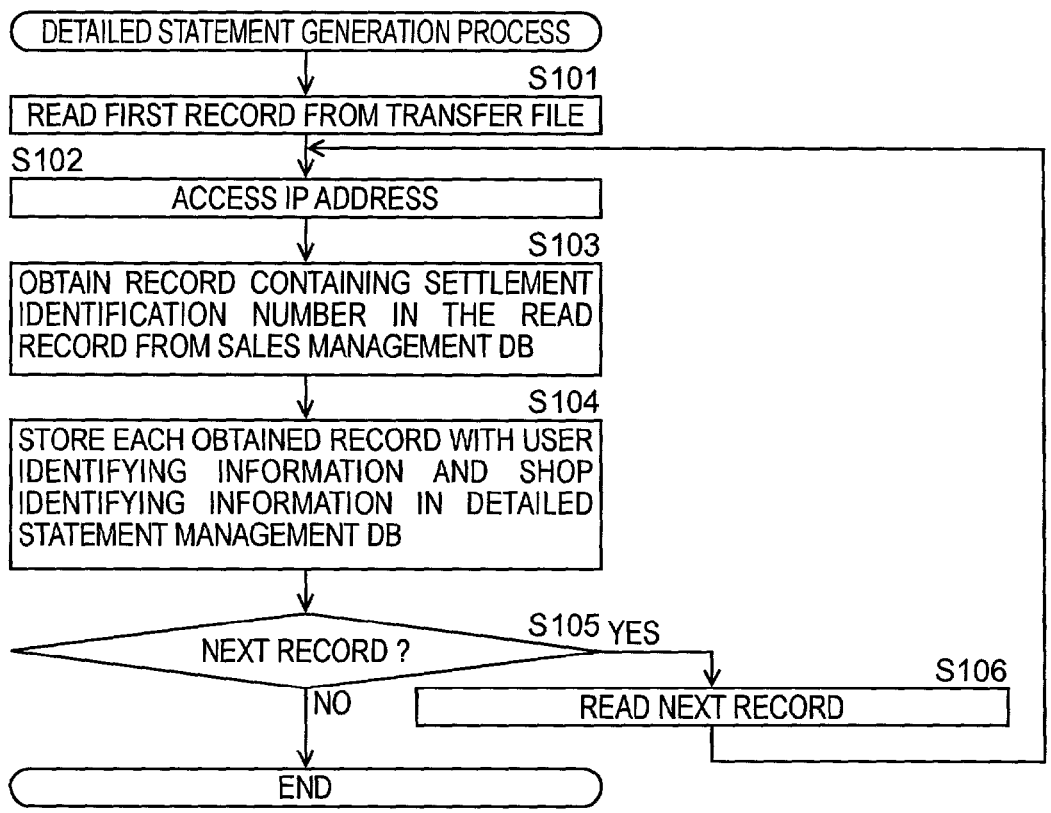
FIG. 12 is a flowchart showing a detailed statement generation process executed in the detailed statement notifying server.

In the detailed statement notifying server 50, when receiving this transfer file from the credit company terminal 30, the CPU 51 reads in the detailed statement generation program 66, and starts a detailed statement generation process based on the program. FIG. 12 is a flowchart showing the detailed statement generation process.

As shown in FIG. 12, in first step S101 after the start of the detailed statement generation process, the CPU 51 reads a first record among a set of records in the transferred file received.

In next step S102, the CPU 51 accesses the IP address contained in the record read out in S101 (or S106).

In subsequent step S103, the CPU 51 extracts records containing the same settlement identification number contained in the record read out in S101 (or S106) from the sales management database 61.

In next step S104, the CPU 51 adds the consumer identifying information and the shop identifying information contained in the record read in S101 (or S106) to each of the records extracted in S103, and stores each record added with the information in the detailed statement management database 65.

In next step S105, the CPU 51 checks whether the transfer file contains an unprocessed record. Then, if there is an unprocessed record, the CPU 51 advances the processing to S106.

In S106, the CPU 51 reads the unprocessed record and loops the processing back to S102.

On the other hand, in S105, if there is not any unprocessed record, the CPU 51 finishes the detailed statement generation process.

With the detailed statement generation process described above, the transaction information based on the data stored in the transfer file sent from the credit company terminal 30, in which the "shop logo", "shop logo address", "maker logo" and "maker logo address" fields are blank, is stored in the detailed statement management database 65.

Figure 13:
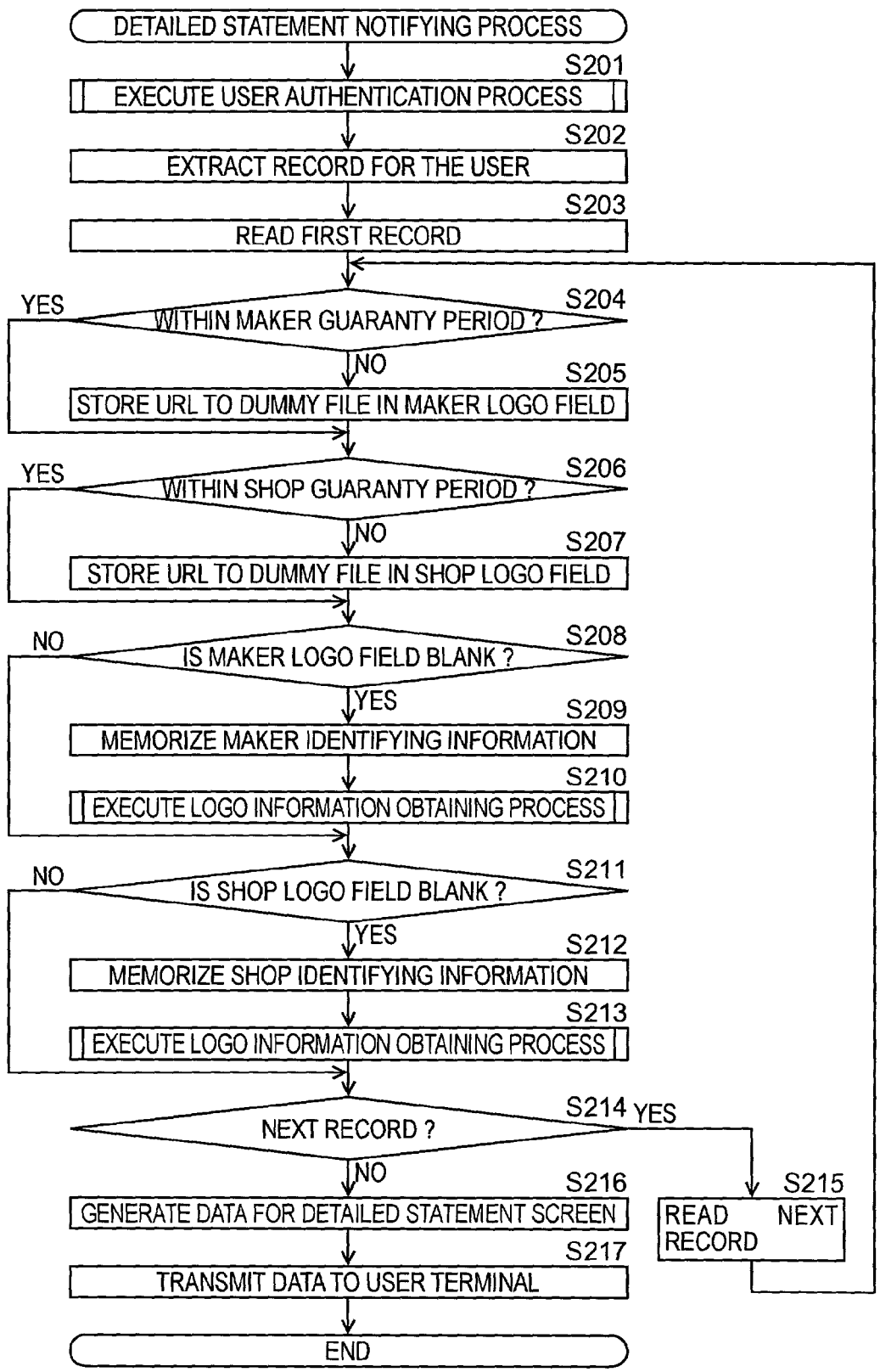
FIG. 13 is a flowchart showing the detailed statement generation process executed in the detailed statement notifying server.

Then, in the detailed statement notifying server 50, when the consumer makes an information browsing request through the WWW Browser on the consumer terminal 10, the CPU 51 reads the detailed statement notifying program 67 to start a detailed statement notifying process based on the program 67. FIG. 13 is a flowchart showing the detailed statement notifying process. As shown in FIG. 13, in first step S201 after the start of the detailed statement notifying process, the CPU 51 executes a user identity authentication process. In the user identity authentication process, the CPU 51 transmits an unillustrated log-in screen to the consumer terminal 10 and, when the consumer identifying information is sent back, checks whether this piece of consumer identifying information is valid. If it is invalid, the CPU 51 transfers a screen indicating the invalidity to the consumer terminal 10. Whereas if it is valid, the consumer's identity is authenticated as a registered consumer. Note that in this user identity authentication process, the CPU 51 accepts also a specified period (that is specified by the consumer) together with the consumer identifying information. Then, the CPU 51, after authenticating the consumer's identity and accepting the specified period in the user identity authentication process, advances the processing to S202.

In S202, the CPU 51 extracts records containing the consumer identifying information and the settlement date/time within the specified period from the detailed statement management database 65.

In next S203, the CPU 51 reads in the first record among the extracted records.

In subsequent step S204, the CPU 51 checks whether a period ranging from the settlement date/time contained in the record read in in S203 (or S215) up to the present time is shorter than the maker guaranty period defined in the record. Namely, the CPU 51 checks whether the present time is within the maker guaranty period defined in the record. Then, if the present time is out of the maker guaranty period, in S205, the CPU 51 stores a URL to a dummy file in the "maker logo" field in the record read in in S203 (or S215). Note that the dummy file is a null file containing only the file name and stored with no image data of the logo. Further, the dummy file may be actually stored with image data of a dummy logo. Moreover, a storage location of this dummy file may be set in the logo management server 40 and in the detailed statement notifying server 50 as well. After a completion of the process in S205, the CPU 51 advances the processing to S206. On the other hand, the CPU 51, when judging in S204 that the present time is within the maker guaranty period, directly advances the processing to S206.

In S206, the CPU 51 checks whether a period ranging from the settlement date/time contained in the record read in in S203 (or S215) up to the present time is shorter than the shop guaranty period. Namely, the CPU 51 checks whether the present time is within the shop guaranty period defined in the record. Then, if the present time is out of the shop guaranty period, in S205, the CPU 51 stores a URL to a dummy file in the "shop logo" field in the record read in in S203 (or S215), and advances the processing to S208. On the other hand, the CPU 51, when judging in S207 that the present time is within the shop guaranty period, directly advances the processing to S208.

Figures 14, 15:
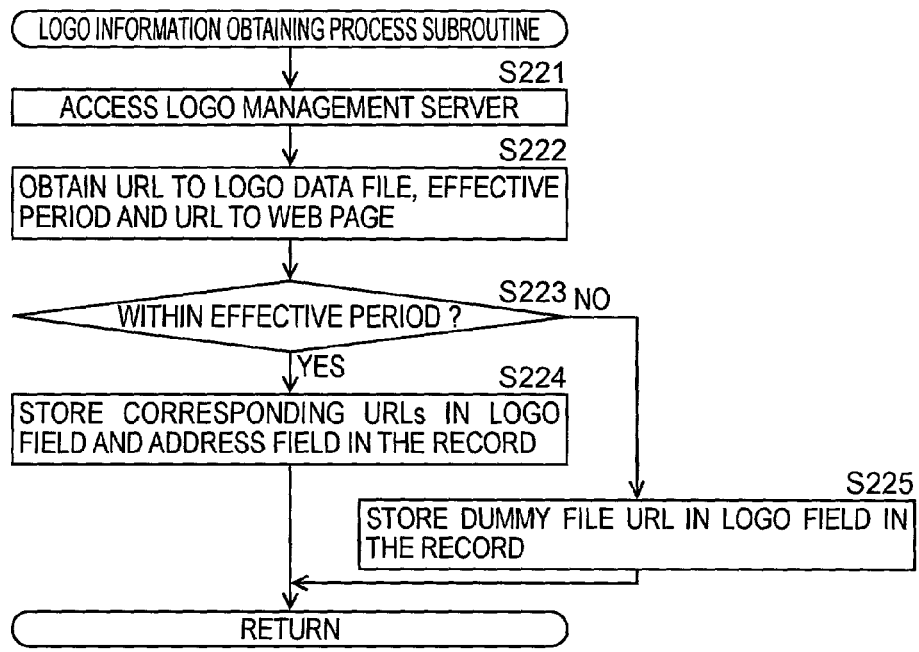
FIG. 14 is a flowchart showing a logo information obtaining process executed in the detailed statement notifying server.
FIG. 15 is a diagram showing a detailed statement screen displayed on a display of the consumer terminal.

In S208, the CPU 51 checks whether the "maker logo" field in the record read in in S203 (or S215) is blank. Then, if it is blank, in S209, the CPU 51 memorizes the maker identifying information contained in the record read in in S203 (or S215), and executes a logo information acquisition process subroutine in next step S210. FIG. 14 is a flowchart showing the logo information acquisition process subroutine.

As shown in FIG. 14, in first step S221 after the start of the logo information acquisition process subroutine, the CPU 51 accesses the logo management server 40.

In next step S222, the CPU 51 obtains from the logo master table 64 of the logo management server 40 a URL to the logo data file of the maker identified by the maker identifying information memorized in S209, its corresponding logo effective period and a URL to the Web page of the maker. To be specific, when the CPU 51 notifies the logo management server 40 of a search request message specifying the maker identifying information, the CPU 41 of the logo management server 40, according to a Servlet (Server-Side-Applet) program, extracts the record containing the maker identifying information from the logo master table 64, generates a URL to the logo data file from an address name contained in the extracted record, and sends the generated URL to the logo data file, the effective period contained in the extracted record and the URL to the Web page back to the detailed statement notifying server 50. With these processes executed, the CPU 51 obtains the logo information and the effective period.

In next step S223, the CPU 51 checks whether the present time is within the effective period obtained in S222. Then, if the present time is within the effective period, in S224, the CPU 51 stores the URL to the logo data file and the URL to the Web page that have been obtained in S222 in the "maker logo" field and the "maker logo address" field in the record read in in S203 (S215). Then, the logo information acquisition process subroutine comes to an end, and the processing goes back to the main routine shown in FIG. 13. On the other hand, if judging in S223 that the present time is out of the effective period, the CPU 51 stores the URL to the dummy file in the "maker logo" field in the record read in in S203 (or S215) and finishes the logo information acquisition process subroutine in S225, and the processing returns to the main routine shown in FIG. 13.

In the main routine shown in FIG. 13, the CPU 51 advances the processing from S210 to S211. On the other hand, if judging in S208 that the "maker logo" field in the record read in in S203 (orS215) is not blank, the CPU 51 diverts the processing to S211.

The CPU 51 checks in S211 whether the "shop logo" field in the record read in in S203 (S215) is blank. Then, if it is blank, in S212, the CPU 51 memorizes the shop identifying information contained in the record read in in S203 (or S215), and executes in next step S213 the logo information acquisition process subroutine in FIG. 14. Note that the content of this logo information acquisition process subroutine has been described above, and therefore its detailed explanation is herein omitted. In short, however, the CPU 51 checks whether the present time is within the effective period of the logo of the shop identified by the shop identifying information memorized in S212 (S223), and, if it is within the effective period, stores the URL to the logo data file that is obtained from the logo management server 40 and the URL to the Web page in the "shop logo" field and the "shop logo address" field in the record read in in S203 (or S215), respectively (S224). Whereas if it is out of the effective period, the CPU 51 stores the URL to the dummy file in the "shop logo" field in the record read in in S203 (or S215) (S225). Then, after finishing the logo information acquisition process subroutine, the CPU 51 advances the processing to S214. On the other hand, if judging in S211 that the "shop logo" field in the record read in in S203 (or S215) is not blank, the CPU 51 directly advances the processing to S214.

The CPU 51 checks in S214 whether there is an unprocessed record. If there is an unprocessed record, in S215, the CPU 51 reads in the unprocessed record among the records extracted in S202, and the processing loops back to S204. Whereas if judging in S214 that there is not any unprocessed record, the CPU 51 advances the processing to S216.

In S216, the CPU 51 generates data for displaying a first detailed statement screen on the basis of all the records containing the above consumer identifying information and the settlement date/time falling within the specified period. FIG. 15 shows one example of the first detailed statement screen. As shown in FIG. 15, a detailed statement table 1*a* is shown in the first detailed statement screen. The detailed statement table 1*a* is formatted so that the respective lines are segmented by a "transaction date/time" field, a "maker" field, a "shop" field, an "abstract" field and a "amount-of-money transacted" field. A settlement date/time when the consumer purchased the article, a name of the article purchased, and a price of this article in each record are entered in the "transaction date/time" field, the "abstract" field and the "amount-of-money transacted" field, respectively, in each line. Further, a tool button that can be clicked is defined in the "maker" field or the "shop" field in the detailed statement table 1*a*. A URL to each logo data file is embedded in the tool button so that a maker logo or a shop logo with respect to this article is displayed. Further, in case the URL to the Web page is stored in the "maker logo address" field or the "shop logo address" field in the record, the URL is set as a hyperlinked URL in the tool button defined in the "maker" field or the "shop" field in the detailed statement table 1*a*. Then, after generating the data for displaying the first detailed statement screen described above, the CPU 51 advances the processing to S217.

In S217, the CPU 51 transmits the data for displaying the detailed statement screen to the consumer terminal 10 as the accessing-side terminal, thereby finishing the detailed statement notifying process.

The WWW Browser on the consumer terminal 10 receiving the data transmitted in accordance with the detailed statement notifying process functions to display the first detailed statement screen as shown in FIG. 15 on the display 10*a*. At this time, the WWW Browser accesses the logo management server 40 in accordance with the URLs embedded in the tool buttons in the "maker" field and the "shop" field in the detailed statement table 1*a*, then obtains from the logo management server 40 a logo data file identified with a file name contained in the URL, and pastes and displays an image based on the image data stored in the logo data file on the tool buttons in the corresponding "maker" field and "shop" field. Note that if the file indicated by the above file name is a dummy file, nothing or a dummy logo is displayed on the tool button.

As discussed above, according to the first embodiment, the consumer accesses the detailed statement notifying server 50 from the consumer terminal 10 and inputs the specified period, whereby the detailed statement of the card used during the specified period is displayed on the display 10a and, besides, any one or both of he maker logo and the shop logo are displayed in the "maker" field or/and the "shop" field in the detailed statement table 1a. The consumer is therefore able to grasp the content of the transaction instantaneously upon seeing the first detailed statement screen.

Further, according to the first embodiment, if it is within the guaranty period of the article, the hyperlinked URL is set in the logo displayed on the tool button on the first detailed statement screen. Accordingly, the maker and the shop can effectively utilize the detailed statement screen 1 as an interface for providing after-sales care services by previously registering the URL to the Web page for providing the information on the guaranty of the article in the logo master table 64.

Further, according to the first embodiment, if an article (e.g., a food) having no guaranty period is sold to the consumer, the "maker guaranty period" field and the "shop guaranty period" field in the record of this article may be blank. In this case, file names of dummy files are stored in the "shop logo" field and the "maker logo" field in the detailed statement management database 65 in steps S204 through S207 in the detailed statement notifying process. Hence, the logos are not displayed in the "shop" field and the "maker" field on the first detailed statement screen, or alternatively dummy logos are displayed. Note that URLs embedded in these logos may be, for example, URLs to a Web page for providing the information for introducing the maker and the shop and to a Web page for providing a users' community.

SECOND EMBODIMENT

Figure 16:
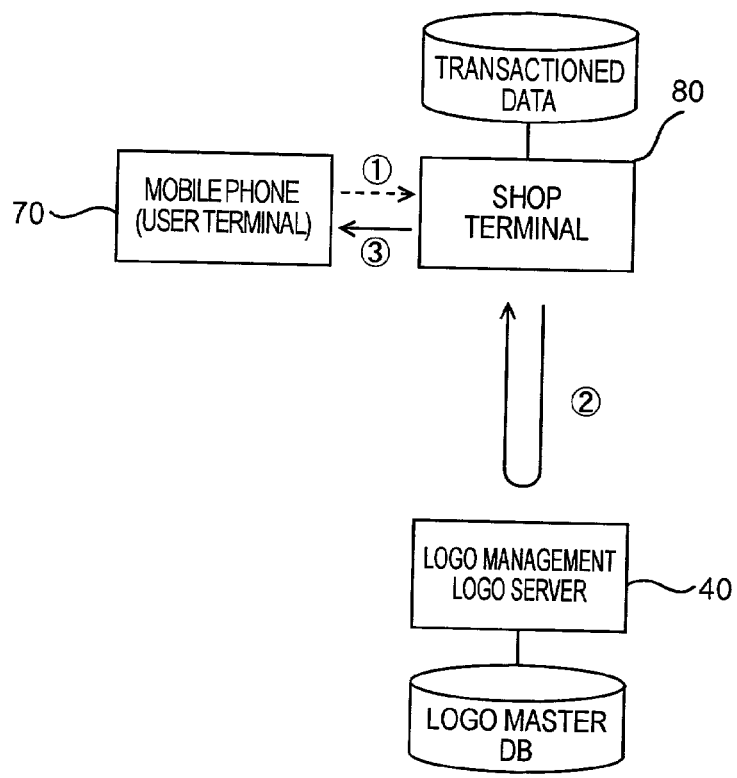
FIG. 16 is an explanatory diagram showing a processing flow in the whole system in a second embodiment.

A characteristic of a second embodiment is that the shop terminal has the logo information obtaining function assigned the detailed statement notifying server 50 in the first embodiment, and that the consumer terminal 10 is a mobile phone incorporating an e-mail delivering/receiving function. Processes executed in the second embodiment are processes (1) through (3) as shown in FIG. 16. The first process (1) is that, when the consumer purchases an article at the shop, transaction information thereof is cached in a shop terminal 80. The second process (2) is that the shop terminal 80 obtains pieces of logo information (a URL to a logo data file and a URL to a Web page) of the maker from the logo management server 40 on the basis of the transaction information, and generates data for displaying a second detailed statement screen (see FIG. 21). The third process (3) is that the shop terminal 80 delivers an e-mail describing a URL hyperlinked to the second detailed statement screen to a mobile phone 80. Note that in the second embodiment, information on a detailed statement as to a settlement is immediately transmitted to the mobile phone 70 the moment that the consumer settles an account at the shop, while the detailed statement notifying server 50 in the first embodiment transmits the data for displaying the second detailed statement screen to the consumer terminal 10 in response to the request via the WWW Browser from the consumer terminal 10. The following is a specific description thereof.

A computer network system as a second embodiment of the present invention to which the detailed statement notifying system according to the present invention is applied is configured by the mobile phone 70 serving as a consumer terminal operated by the consumer, the shop terminal 80 as the detailed statement notifying system installed in the shop and the logo management server 40, these components being connected to each other via the Internet. Note that the logo management server 40 is the same as that in the first embodiment, and hence its repetitive explanation is omitted.

Figure 17:
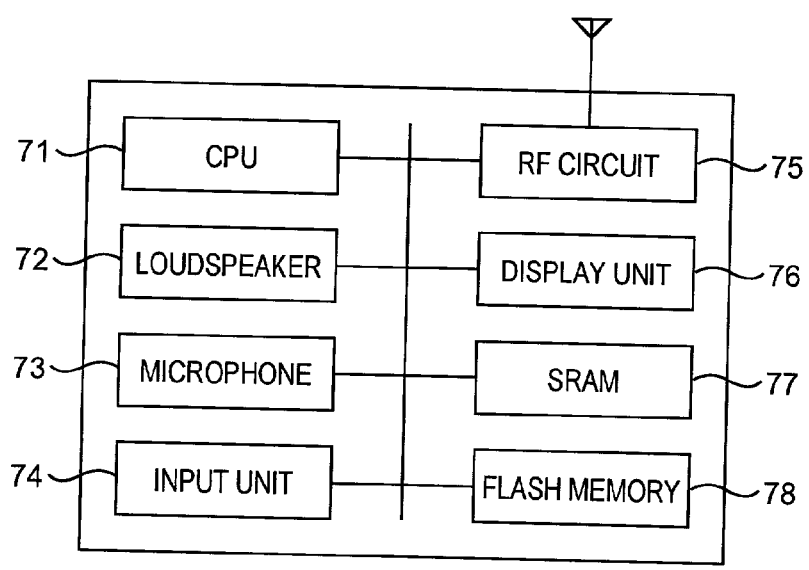
FIG. 17 is a block diagram schematically showing a configuration of a mobile phone.

The mobile phone 70 includes, as shown in a block diagram of FIG. 17, a CPU 71, a loudspeaker 72, a microphone 73, an input unit 74, an RF (Radio Frequency) circuit 75, a display unit 76, an SRAM (Static RAM) 77 and a flash memory 78.

The CPU 71 is a central processing unit for controlling the respective hardware components 72 through 78. The loudspeaker 72 is a voice output device for outputting voices based on electric signals. The microphone 73 is an interface for converting voices into electric signals. The input unit 74 is an operation panel, including numeral keys and several control keys, which detects a pressed key to output the electric signal corresponding to the pressed key. The RF circuit 75 controls a transmission and a receipt of radio waves to and from nearest base station. The display unit 76 is constructed of a display panel for displaying a variety of screens and a graphic display circuit for controlling the display panel. The SRAM 77 is the static RAM, for caching various programs read by the CPU 71, on which an operation area for the CPU 11 is developed. The flash memory 78 is a storage unit for storing the variety of programs, various categories configurations set by the user, telephone directory data, call melodies and so on. Note that the flash memory 78 is installed with a mailer for actualizing an e-mail delivering/receiving function and an e-mail edit function, and a browser for browsing a hyper text described in an HTML subset.

Figure 18:
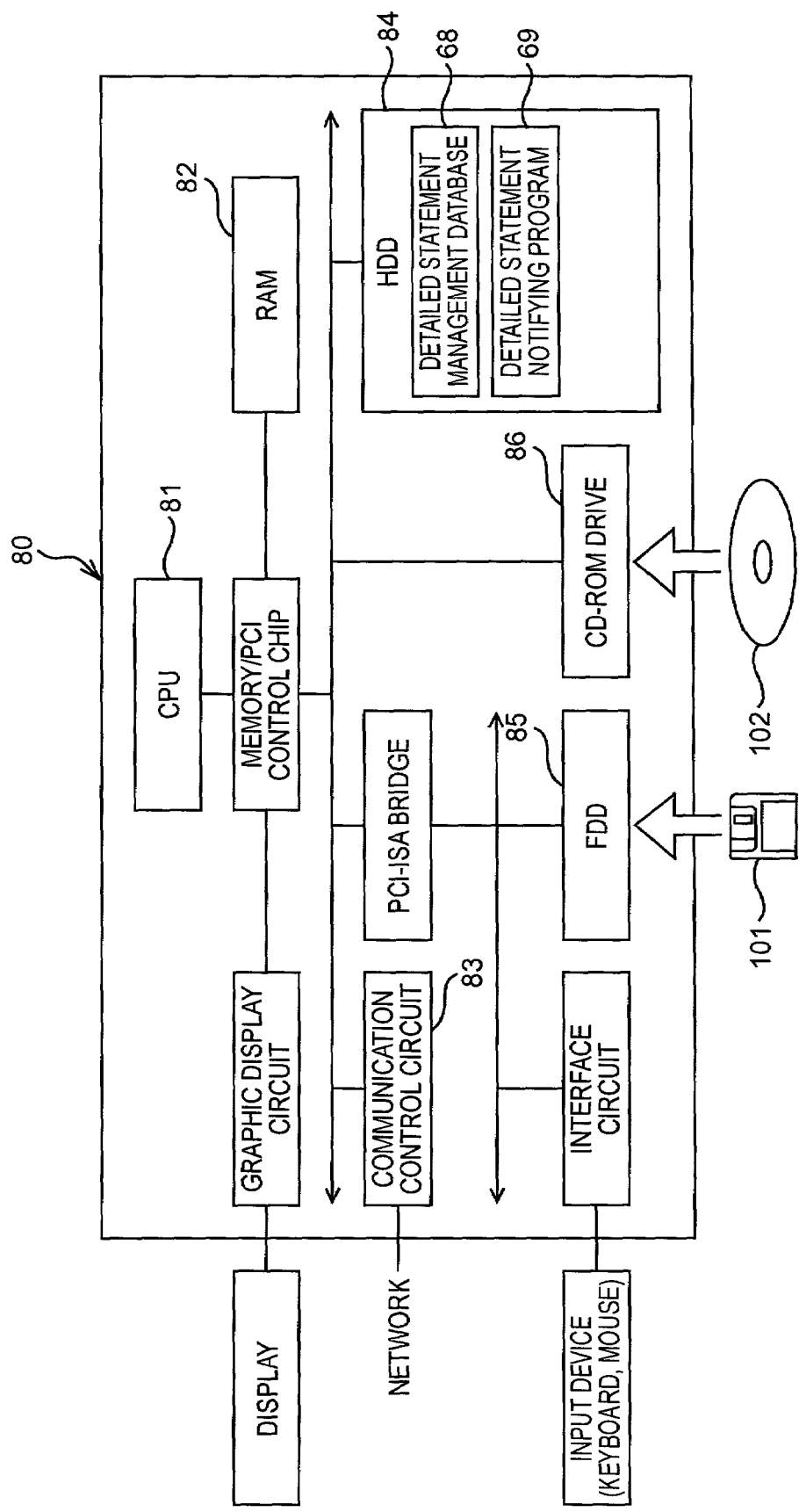
FIG. 18 is a block diagram schematically showing an architecture of the shop terminal.

The shop terminal 80 has, as shown in a block diagram of FIG. 18, the same circuit configuration as the shop terminal 20 in the first embodiment, however, its HDD (corresponding to a storage unit) 84 is stored with a detailed statement management database 68 as a substitute for the sales management database 61 and with a detailed statement notifying program (corresponding to a logo information acquisition module, a detailed statement generation module and a transmission module) 69. Note that this detailed statement notifying program 69 may be read from a flexible disk 101 or a CD-ROM 102 through the FDD 85 or CD-ROM drive 86 and installed into the HDD 84.

The detailed statement database 68 stored in the HDD 84, as shown in FIG. 19, such a data structure that the "shop ID", "shop logo", "shop logo address", "maker guaranty period" and "shop guaranty period" fields are eliminated from those of the detailed statement management database 65 shown in FIG. 11. Accordingly, the repetitive explanations of these fields are omitted. The detailed statement management database 68 is temporarily stored with records of data entered in the respective fields other than the "maker logo" and "maker logo address" fields whenever the consumer shows a consumer's own identification number to a shop worker in order to purchase an article and settles an account. Note that the consumer identification number described above may be a credit card number defined by the credit card company or a membership number defined by the shop for every individual consumer registered as a so-called point card member. In any case, the consumer identification number recorded on the credit card or a point card is read with a dedicated card reader, and the article information is inputted to a POS (Point Of Sales) terminal, whereby the information on this transaction is transmitted to the shop terminal 80 connected to the card reader and the POS terminal and then stored in the detailed statement management database 68.

When some records are inputted to the detailed statement management database 68, the detailed statement notifying program 69 stored in the HDD 84 makes the CPU 81 obtain pieces of logo information (a URL specifying a storage location of a logo data file and a URL linked to a Web page of the shop or the maker) corresponding to the shop identifying information and the maker identifying information contained in the inputted record from the logo management server 40, generate data for displaying the second detailed statement screen (see FIG. 21) including the information on the detailed statement as to the settlement made by the consumer on the basis of the consumer identifying information, the maker identifying information, a settlement date/time, names of the articles, prices and the logo information, generates a URL to a file stored with these pieces of data, and delivers an e-mail describing this URL to the mobile phone 70.

Moreover, the HDD 84 retains, an un-illustrated table stored with a map of the consumer identification number to an e-mail address of the mobile phone 70 of the consumer identified by this consumer identification number.

Given next is an explanation of processes executed in the computer network system having thus explained system architecture.

Figure 20:
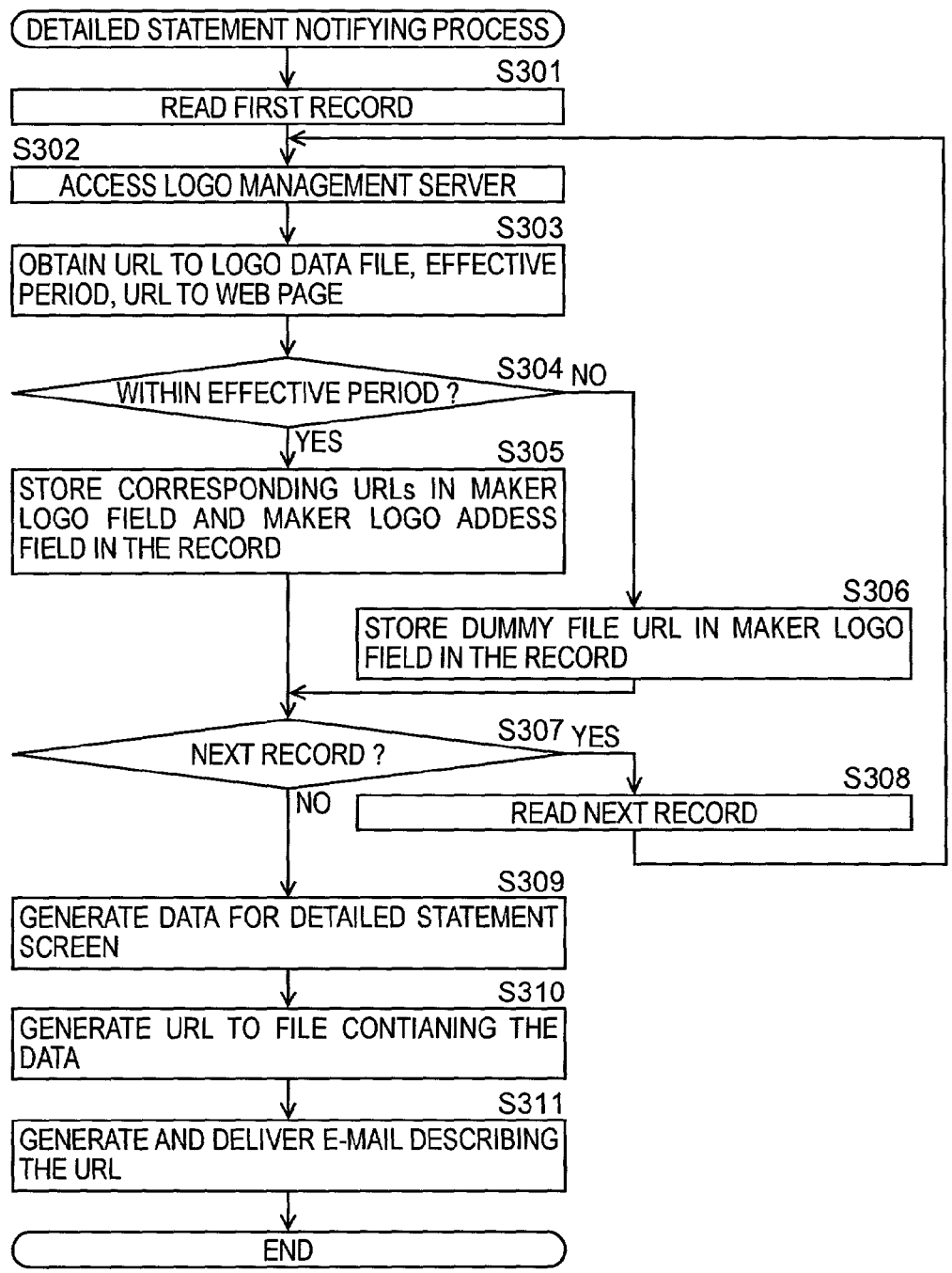
FIG. 20 is a flowchart showing the detailed statement generation process executed in the shop terminal.

When the consumer purchases an article at the shop and settles the account by use of his or her credit card or with producing his or her point card, the record of the transaction made by this consumer is temporarily stored in the detailed statement management database 68 in the shop terminal 80, as discussed above. Once the information is stored in the detailed statement management database 68, the CPU 81 immediately reads in the detailed statement notifying program 69, and starts the detailed statement notifying process. FIG. 20 is a flowchart showing the detailed statement notifying process.

As shown in FIG. 20, in first step S301 after the start of the detailed statement notifying process, the CPU 81 reads in the first record among the records stored in the detailed statement management database 68.

In next step S302, the CPU 81 accesses the logo management server 40.

In next step S303, the CPU 81 obtains from a logo master table 64 a URL to the logo data file of the maker identified by the maker identifying information contained in the record read in in S301 (or S308), an effective period of the maker's logo and a URL to the Web page of the maker. Note that the specific obtaining method had been already described (S222 in the flowchart of FIG. 14), and hence its repetitive description is herein omitted.

In subsequent step S304, the CPU 81 checks whether a period ranging from the settlement date/time contained in the record read in in S301 (or s308) up to the present time is within the effective period of the maker's logo obtained in S303. Then, if it is within the effective period, in S305, the CPU 81 registers the URL to the logo data file and the URL to the Web page obtained in S303 in the "maker logo" field and the "maker logo address" field in the record read in in S301 (or S308), and advances the processing to S307. Whereas if judging in S304 that it is out of the effective period, in S306, the CPU 81 stores a URL to a dummy file in the "maker logo" field in the record read in in S301 (or S308), and advances the processing to S307.

In S307, the CPU 81 checks whether there is an unprocessed record. If there is an unprocessed record, in S308, the CPU 81 reads the unprocessed record, and the processing loops back to S302. Whereas if judging in S307 that there is not any unprocessed record, in S309, the CPU 81 generates data for displaying the second detailed statement screen on the basis of all the records stored in the detailed statement management database 68. FIG. 21 shows one example of the second detailed statement screen. As shown in FIG. 21, the article names contained in the records are displayed in lines on the second detailed statement screen. Further, in the same line as each article name, price of the corresponding article is displayed and tool button that can be clicked is defined. A URL to the maker logo data file of the articles is embedded in the tool button so that the maker logo of the article is displayed on the tool button. Moreover, in case the URL to the Web page of the maker is stored in the "maker logo address" field with respect to the article, the URL is set as a hyperlinked URL in the tool buttons. Further, a total of the prices of the article purchased by the consumer, a purchase date/time and a shop name are also displayed on the detailed statement screen 2. After generating the data for displaying the second detailed statement screen, the CPU 81 advances the processing to S310.

In S310, the CPU 81 generates a URL specifying a storage location of the file containing the data for displaying the second detailed statement screen that have been generated in S309 from a file name of the file.

In next step S311, the CPU 81 generates an e-mail describing the URL generated in S310, and delivers the e-mail to an e-mail address corresponding to the consumer identification number, and the detailed statement notifying process comes to an end.

In the detailed statement notifying process described above, when the e-mail is delivered to the e-mail address corresponding to the consumer identification number, the mailer on the mobile phone 70 having this e-mail address executes a process of receiving and storing the e-mail in the flash memory 78. Then, the consumer operates the mobile phone 70 to display a content of the e-mail on the display unit 76, the mailer functions to display the URL described in this e-mail in a state where the consumer can click this URL.

Figure 22:
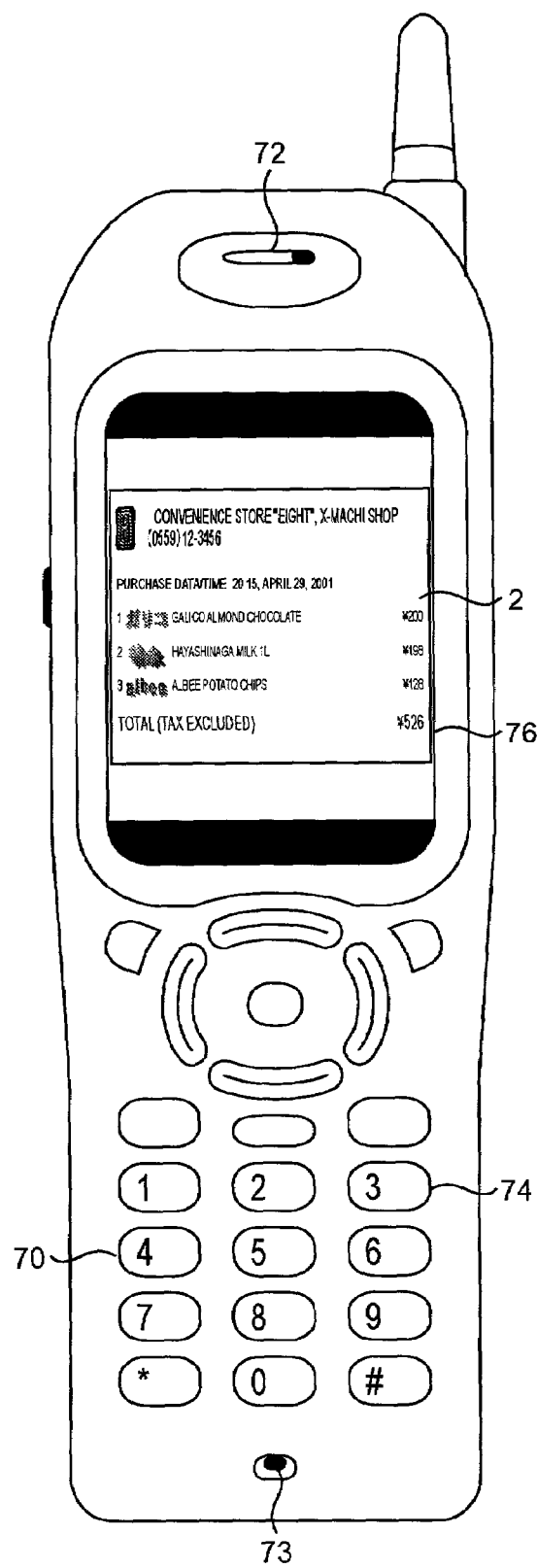
FIG. 22 is a diagram showing the mobile phone in a state of displaying the detailed statement screen on its display.

Then, when the consumer selects and clicks the URL described in the e-mail, the browser is booted and accesses the shop terminal 80 according to this URL, then obtains the data for displaying the second detailed statement screen indicated by the file name contained in the URL, and displays the second detailed statement screen 2 on the display unit 76 as shown in FIG. 22. At this time, the browser accesses the logo management server 40 in accordance with the URL embedded in the tool button displayed on the second detailed statement screen, then obtains from the logo management server 40 the logo data file indicated by the file name contained in the URL, and pastes and displays an image based on the image data stored in the logo data file on the corresponding tool button. Note that if the file indicated by the file name is a dummy file, nothing or a dummy logo is displayed on the tool button.

As explained above, according to the second embodiment, the consumer settles the account by utilizing his or her credit card or with producing his or her point card in order to purchase the article at the shop, whereby the e-mail describing a URL to the second detailed statement screen is delivered to the mobile phone 70 of the consumer. Then, if the customer accesses (clicks) this URL, the second detailed statement screen is displayed on the display unit 76. The second detailed statement screen is available as a substitute for a cash-register receipt handed over from a cashier to the consumer at the check-out counter in the shop. A maker logo of the article purchased by the consumer might be shown in the second detailed statement screen thus displayed on the display unit 76 with its article name and its price, so that the consumer is able to grasp the content of the transaction promptly by seeing this detailed statement screen 2.

Further, in the second embodiment, the hyperlinked URL is embedded in the logo displayed as the tool button on the second detailed statement screen. Accordingly, if the maker previously registers in the logo master table 64 a URL to a Web page for providing self-introduction information or information on the guaranty for the article, the second detailed statement screen 2 can be effectively utilized as an interface for providing an advertisement or after-sales care services.

THIRD EMBODIMENT

Figure 23:
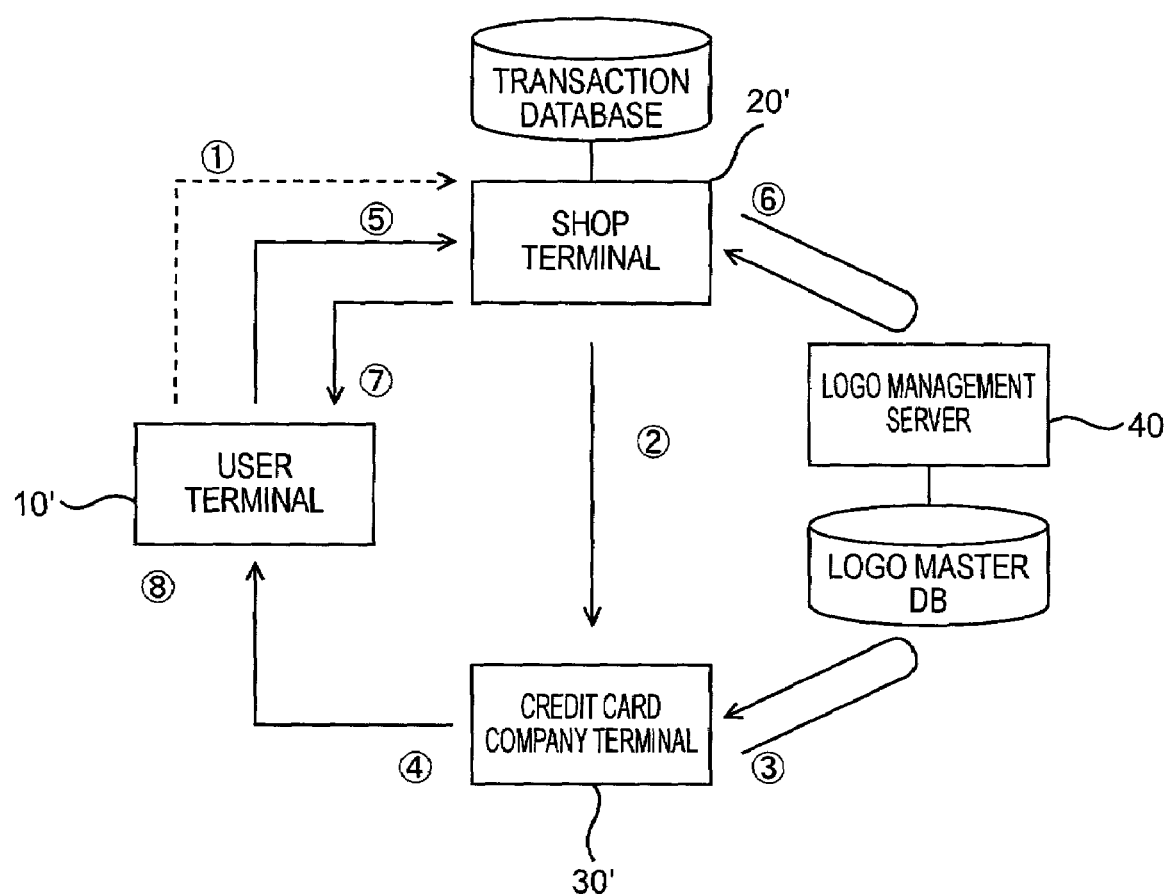
FIG. 23 is an explanatory diagram showing a processing flow in the whole system in a third embodiment.

A characteristic of a third embodiment is that the shop terminal 20 and the credit company terminal 30 have the logo information obtaining function assigned the detailed statement notifying server 50 in the first embodiment. The following is an outline of processes executed in the third embodiment. As shown in FIG. 23 as an explanatory diagram, the first process (1) is that, when the consumer purchases an article by use of his or her credit card at the shop, the transaction information thereof is stored in a shop terminal 20'. The second process (2) is that the transaction information is simultaneously transmitted to a credit company terminal 30' from the shop terminal 20', and is stored within the credit company terminal 30'. The third process (3) is that the credit company terminal 30' obtains logo information of the shop from the logo management server 40 on the basis of the transaction information. The fourth process (4) is that an attachment file of an e-mail is stored with a settlement identification number, a settlement date/time and the shop logo information, and the e-mail containing this file is transmitted to a consumer terminal 10'. The fifth process (5) is that the consumer terminal 10' receiving the e-mail updates a calendar screen (see FIG. 31) on the basis of the information contained in the attachment file of the e-mail. Then, the sixth process (6) is that, when the consumer clicks the shop logo on the calendar screen, the shop terminal 20' is notified of the settlement identification number. The seventh process (7) is that the shop terminal 20' obtains maker logo information on the basis of the article information identified by the settlement identification number, and generates data for displaying a third detailed statement screen (see FIG. 33) on the basis of the article information and the logo information. The eighth process (8) is that the shop terminal 20' transmits the thus generated data to the consumer terminal 10'. Then, the ninth process (9) is that the consumer terminal 10' displays the third detailed statement screen on the display.

Figure 24:
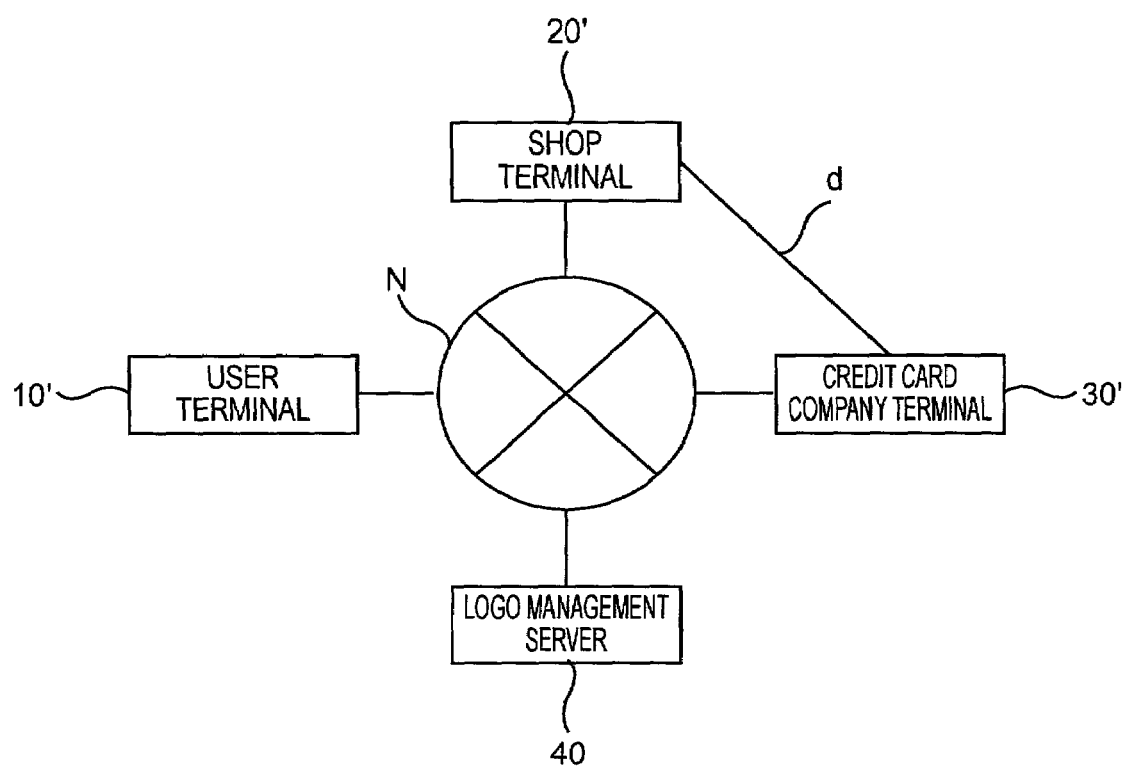
FIG. 24 is a block diagram schematically showing an architecture of the whole system in the third embodiment.

The contents of the processes executed in the third embodiment will hereinafter be specifically explained. Note that the explanations of the same configurations (components) as those in the first embodiment are omitted. FIG. 24 schematically shows a system architecture of a whole computer network system as a third embodiment of the present invention to which the detailed statement notifying system according to the present invention is applied. As shown in FIG. 24, the computer network system in the third embodiment is configured by the consumer terminal 10', the shop terminal (corresponding to the detailed statement notifying system) 20', the credit company terminal (corresponding to the detailed statement notifying system) 30' and the logo management server 40, these terminals and server being connected to each other via the Internet N. Further, the shop terminal 20' connected to the credit company terminal 30' via a leased line d.

Figure 25:
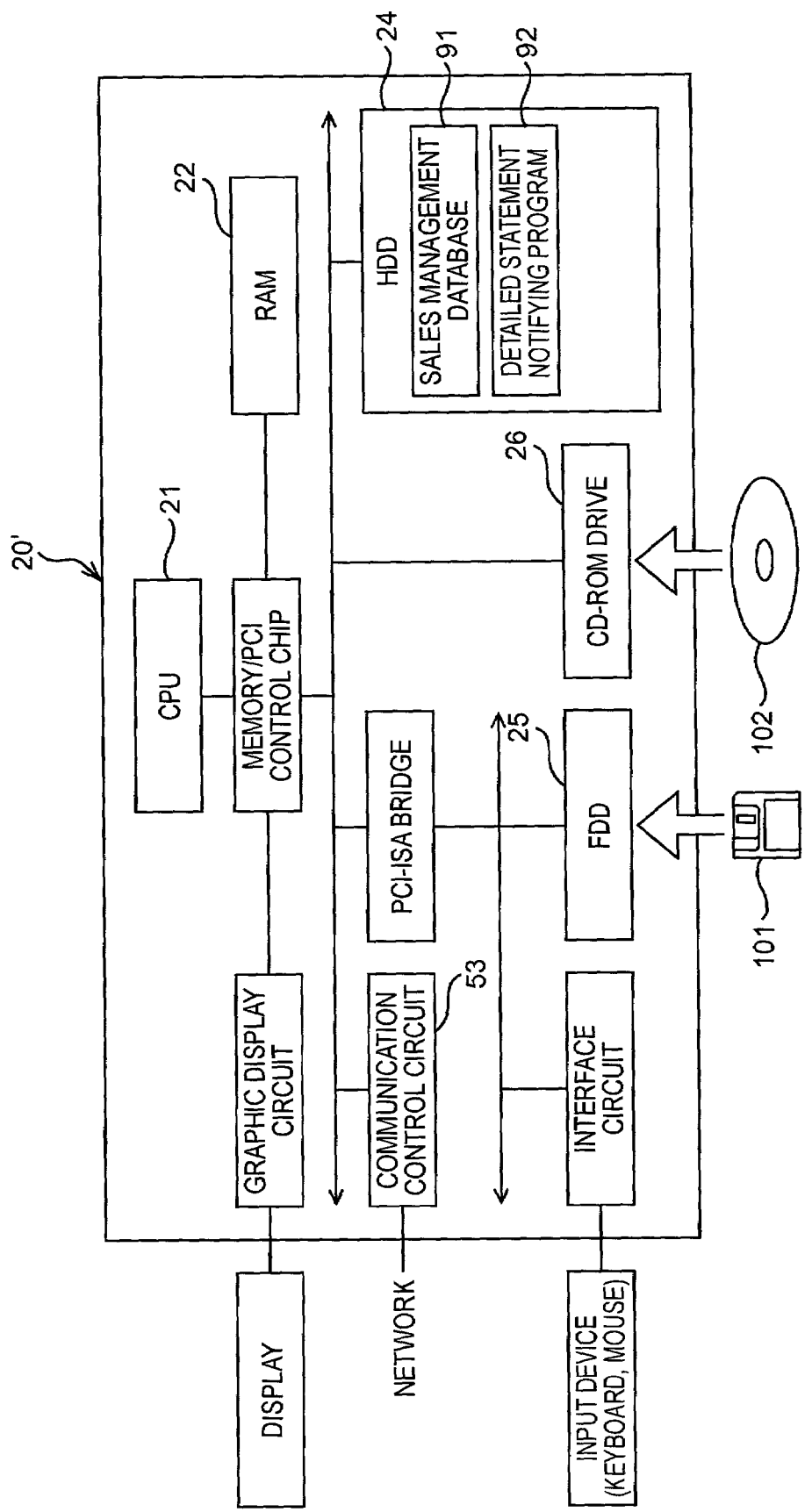
FIG. 25 is a block diagram schematically showing an architecture of the shop terminal.

The shop terminal 20' has, as shown in a block diagram of FIG. 25, the same internal circuit configuration as the shop terminal 20 in the first embodiment, however, its HDD (corresponding to a storage unit) 24 is stored with a sales management database 91 that replaces the sales management database 61 and with a detailed statement notifying program (corresponding to a logo information acquisition module, a detailed statement generation module and a transmission module) 92. Note that this detailed statement notifying program 92 may be read from the flexible disk 101 or the CD-ROM 102 through the FDD 25 or the CD-ROM drive 26 and installed into the HDD 24.

The sales management database 91 has, as shown in FIG. 26, such a data structure that the "maker logo" and "maker logo address" fields are added to and the "shop guaranty period" field is deleted from the sales management database 61 shown in FIG. 5. The explanations of these fields are omitted. Note that this sales management database 91 is stored with records of data entered in the respective fields excluding the "maker logo" and "maker logo address" fields whenever the consumer settles the account by use of his or her credit card.

When the consumer terminal 10' accesses the shop terminal 20' with specifying a settlement identification number, the detailed statement notifying program 92 makes the CPU 21 extract the records containing this settlement identification number from the sales management database 91, obtains from the logo management server 40 a piece of logo information of the maker identified by the maker identifying information contained in each record, generates data for displaying the third detailed statement screen on the basis of the article information identified by the settlement identification number and the shop logo information, and transmits the same data to the consumer terminal 10'.

Figure 27:
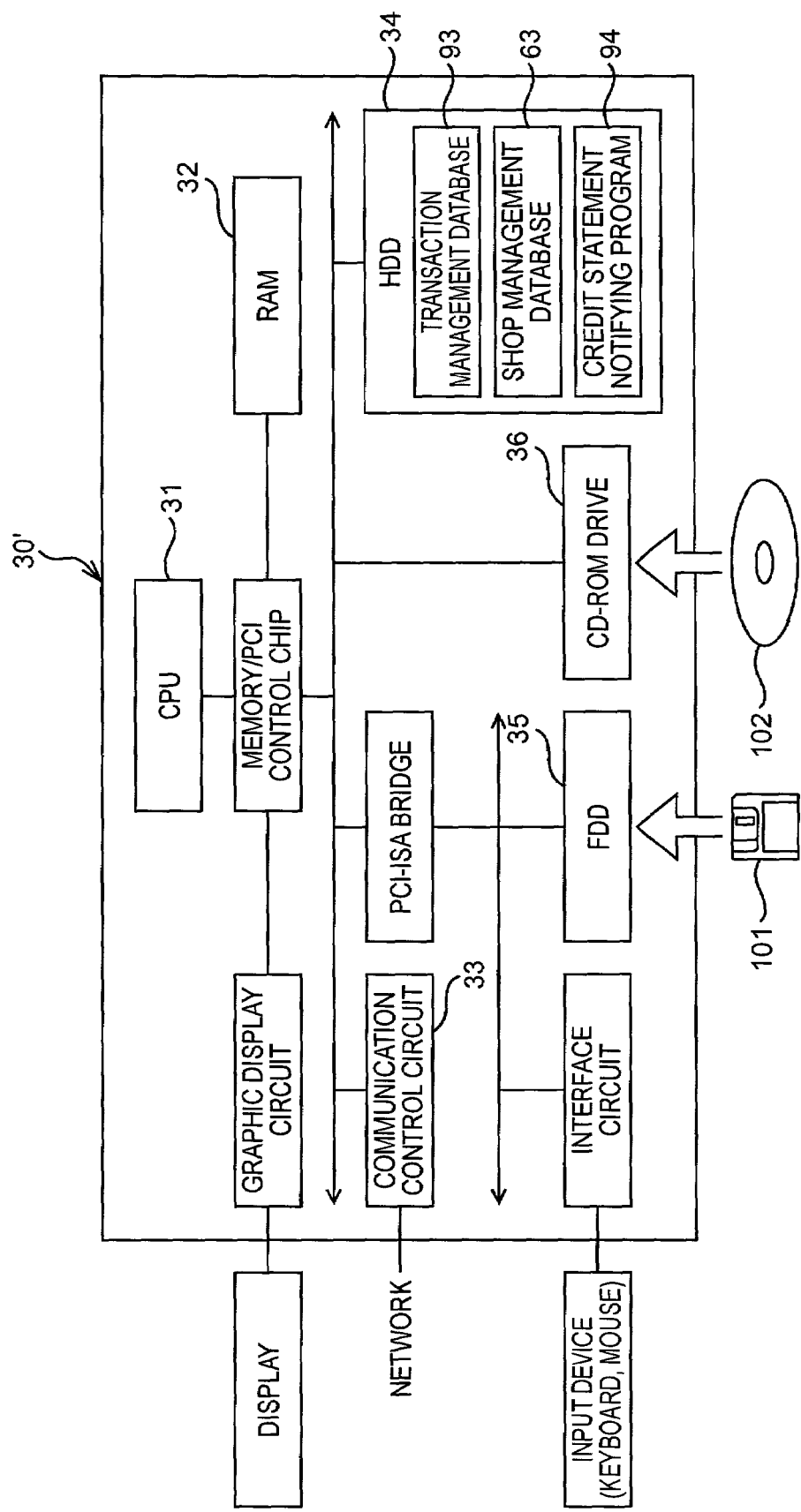
FIG. 27 is a block diagram schematically showing a configuration of an internal circuit of the credit card company terminal.

The credit company terminal 30' has, as shown in a block diagram of FIG. 27, the same internal circuit configuration as the credit company terminal 30 in the first embodiment. The HDD (corresponding to a storage unit) 34 is, however, stored with the shop management database 63 shown in FIG. 7, a transaction management database 93 and a credit statement notifying program (corresponding to a logo information acquisition module, a detailed statement generation module and a transmission module) 94.

The transaction management database 93 has, as shown in FIG. 28, such a data structure that the "shop logo" and "shop logo address" fields are added to the transaction management database 62 shown in FIG. 6. The explanations of these fields are omitted. Note that this transaction management database 93 is stored with records of data entered in the respective fields excluding the "shop logo" and "shop logo address" fields whenever the consumer settles the account by use of his or her credit card.

The credit statement notifying program 94 makes the CPU 31 extract the record for every consumer from the transaction management database 93, obtains from the logo management server 40 a piece of logo information of the shop identified by the shop identifying information contained in each record extracted, stores the transaction information and the shop logo information in an attachment file of the e-mail, and delivers this e-mail to the consumer terminal 10'. Note that this credit statement notifying program 94 may be read from the flexible disk 101 or the CD-ROM 102 through an FDD 35 or a CD-ROM drive 36 and installed into an HDD 34.

Figure 29:
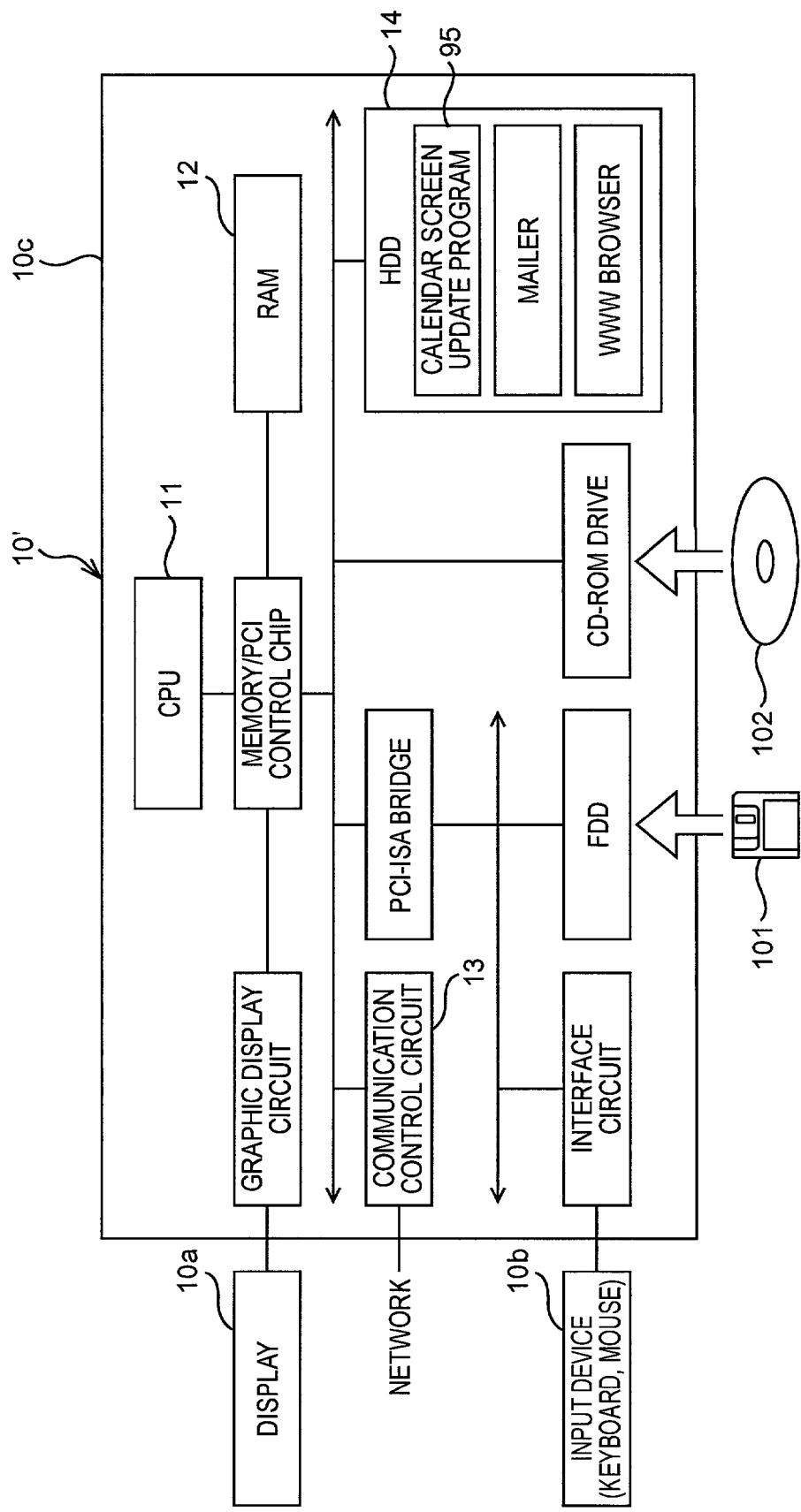
FIG. 29 is a block diagram schematically showing an architecture of the consumer terminal.

The consumer terminal 10' has, as shown in a block diagram of FIG. 29, the same architecture as the consumer terminal 10 in the first embodiment. Its HDD 14 is, however, stored with data (described in the HTML format) for displaying a calendar screen and a calendar screen update program 95 as well as the mailer and the WWW Browser. The calendar screen update program 95 makes the CPU 11 add image data for displaying a logo to the data for displaying the calendar screen (see FIG. 31) on the basis of the information received by the e-mail from the credit company terminal 30'.

Next, processes executed in the computer network system having the architecture described above will be explained.

When the consumer purchases an article at the shop and settles the account by using his or her credit card, the transaction management database 93 in the credit company terminal 30' is stored with a record consisting of a settlement identification number, consumer identifying information, a settlement date/time, shop identifying information and a total amount of money as pieces of information on the transaction made by the consumer. Further, the sales management database 91 in the shop terminal 20' is stored with a record consisting of the settlement identification number, the consumer identifying information, the settlement date/time, a maker identification information, a name of the maker, and article identification information, a name of the article, a price and a maker guaranty period as pieces of information on the transaction made by the consumer.

Figure 30:
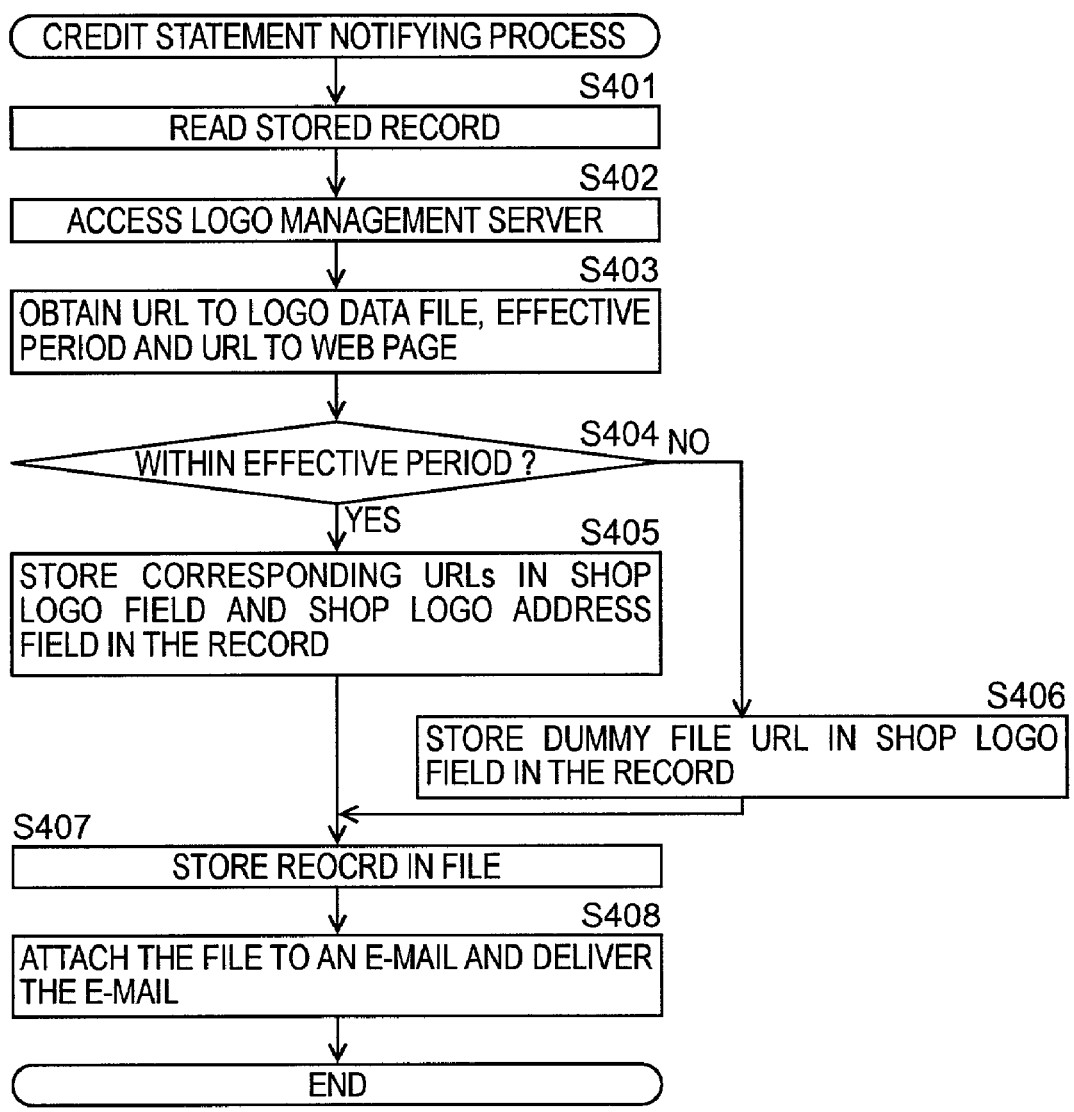
FIG. 30 is a flowchart showing a detailed statement notifying process executed in the credit card company terminal.

In the credit company terminal 30', when the record is stored in the transaction management database 93, the CPU 31 reads in the credit statement notifying program 94 and starts a credit statement notifying process. FIG. 30 is a flowchart showing the credit statement notifying process.

As shown in FIG. 30, in first step S401 after the start of the credit statement notifying process, the CPU 31 read in the record stored in the transaction management database 93.

In next step S402, the CPU 31 accesses the logo management server 40.

In subsequent step S403, the CPU 31 obtains from the logo master table 64 a URL to a logo data file of the shop identified by the shop identifying information contained in the record read in in S401, an effective period of the shop logo and a URL to a Web page of the shop.

In next step S404, the CPU 31 checks whether the present time is within the effective period of the shop obtained in S403. Then, if it is within the effective period, in S405, the CPU 31 stores the URL to the shop logo data and the URL to the Web page of the shop obtained in S403 in the "shop logo" field and the "shop logo address" field in the record read in in S401, and the processing proceeds to S407.

Whereas if judging in S404 that the present time is out of the effective period, in S406, the CPU 31 stores a URL to a dummy file in the "shop logo" field in the record read in inS401 and the URL to the Web page of the shop obtained in S403 in the "shop logo address" field, and the processing proceeds to S407.

In S407, the CPU 31 generates a file containing a set of records each consisting of a URL to the web page of the shop identified by the shop identification information, the settlement identification number, the logo information (the URL to the logo data file and the URL to the Web page) and the settlement date/time in the record read in in S401.

In next step S408, the CPU 31 attaches the file generated in S407 to the e-mail, and delivers this e-mail to an e-mail address of the consumer terminal 10' of the consumer identified by the consumer identification number contained in the record read in in S401. Then, the CPU 31 finishes the credit statement notifying process.

The e-mail delivered in the credit statement notifying process described above is stored in the HDD 14 of the consumer terminal 10'. When the file attached to the e-mail is decorded, the CPU 11 reads in the calendar screen update program 95, thereby starting a calendar screen update process.

After starting this calendar screen update process, the CPU 11 reads in the settlement date/time contained in the record in the decoded file, and also reads in the data for displaying the calendar screen that are stored in the HDD 14. Then, the CPU 11 updates the data for displaying the calendar screen by defining a tool button in a box corresponding to the settlement date/time on the calendar screen based on the decoded file, and finishes the calendar screen update process.

Figure 31:
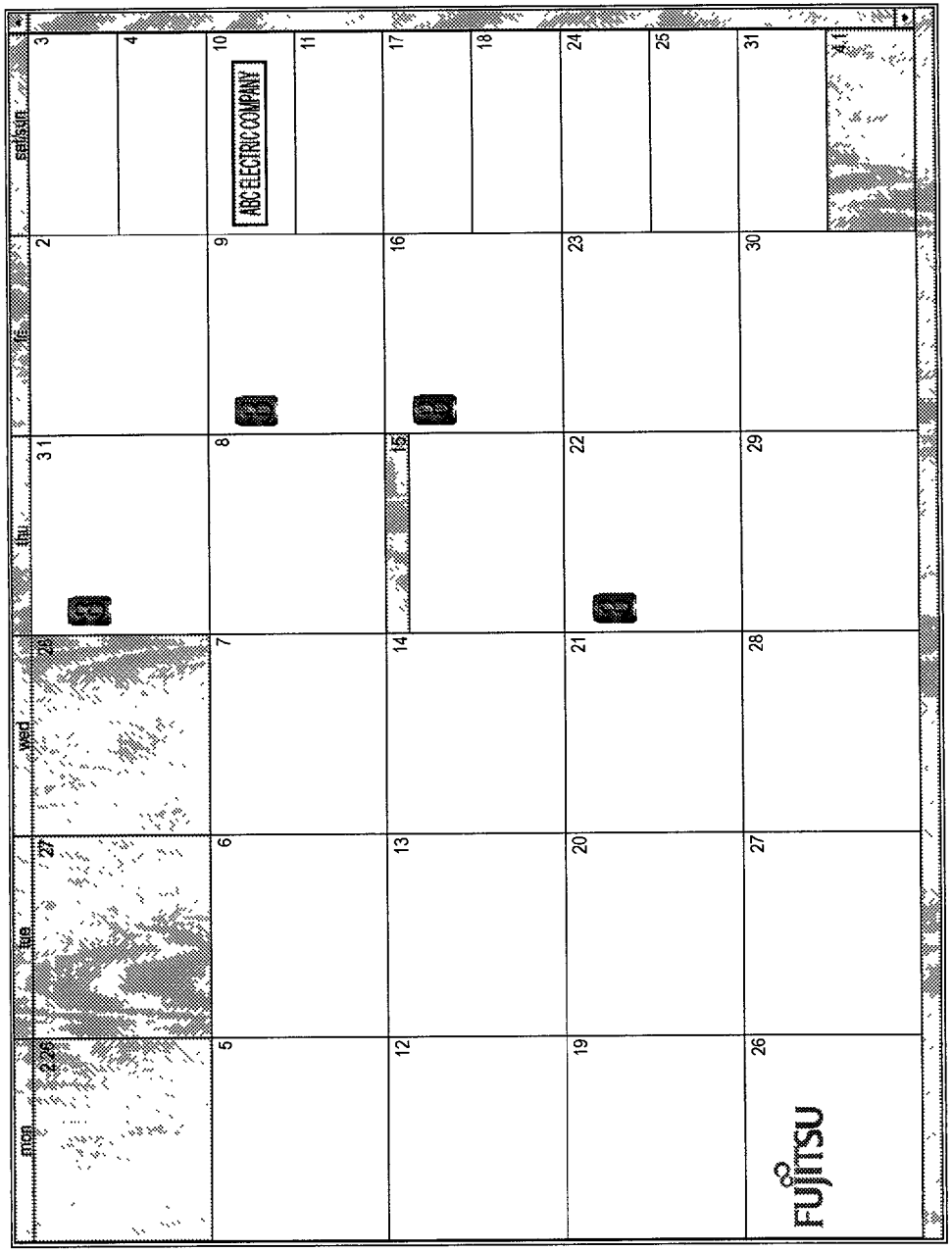
FIG. 31 is a diagram showing a calendar screen displayed on the display of the consumer terminal.

FIG. 31 shows an example of the calendar screen based on the data updated through the calendar screen update process described above. As shown in FIG. 31, a plurality of boxes formed by segmenting a screen area by dates of one month are shown in a calendar screen. A tool button that can be clicked is defied in a box corresponding to the settlement date. A URL to a logo data file of the shop is embedded in the tool button so that the shop logo corresponding to the shop identifying information of which the credit company terminal 30' has notified is displayed on the tool button. Further, a URL to a Web page of the shop is set as a hyperlinked URL in the tool button. Moreover, a settlement identification number is embedded in the tool button as a comment statement undisplayed on the screen. Accordingly, the settlement identification number is invisible on the calendar screen shown in FIG. 31.

When the consumer specifies the updated data for displaying the calendar screen to be opened with the WWW Browser on the consumer terminal 10', the WWW Browser displays the calendar screen. At this time, the WWW Browser accesses the logo management server 40 in accordance with the URL embedded in the tool button on the calendar screen, then obtains from the logo management server 40 the logo data file indicated by the file name contained in the URL, and pastes and displays a shop logo based on the image data contained in the logo data file on the corresponding tool button. Note that, if the file indicated by this file name is a dummy file, only a blank frame or a dummy logo is displayed on the tool button. As a result, the consumer can confirm that the settlement has been done on the date indicated by the box with the logo.

When the consumer clicks the logo on the thus displayed calendar screen, the WWW Browser accesses the shop terminal 20' specified by the URL hyperlinked to this clicked tool button. Then, the WWW Browser sends to the shop terminal 20' a request message making a request for transmitting the data for displaying the Web page corresponding to the settlement identification number embedded in this tool button back to the consumer terminal 10'.

Figure 32:
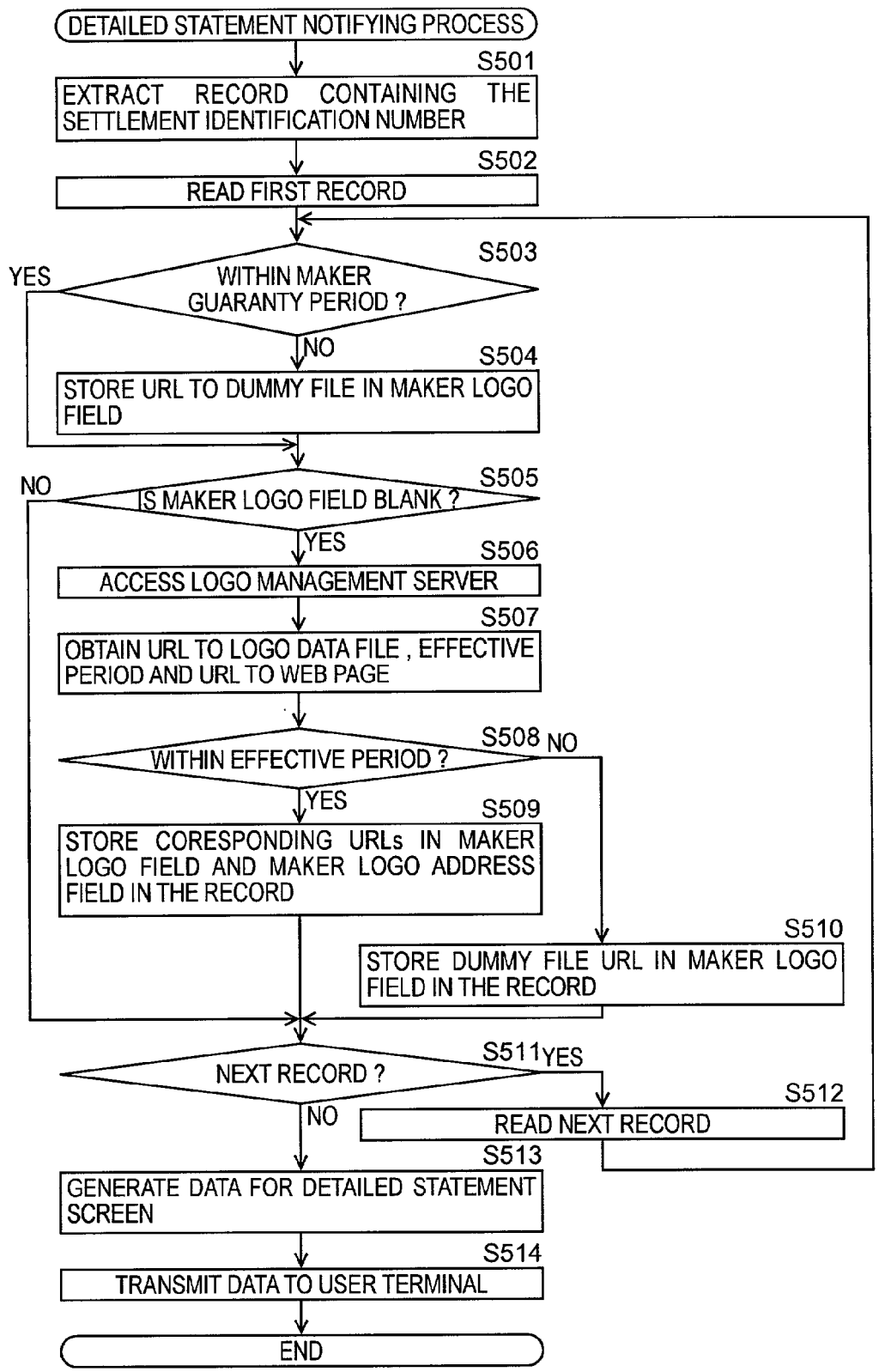
FIG. 32 is a flowchart showing a detailed statement notifying process executed in the shop terminal.

Then, the CPU 21 of the shop terminal 20' reads in the detailed statement notifying program 92 defined as a CGI (Computer Graphic Interface) program or a Servlet (Server-Side-Applet) in response to the request message, and the detailed statement notifying process is started. FIG. 32 is a flowchart showing a content of this detailed statement notifying process.

As shown in FIG. 32, in first step S501 after the start of the detailed statement notifying process, the CPU 21 extracts records containing the settlement identification number specified in the request massage out of the sales management database 91.

In next step S502, the CPU 21 reads in the first record among the records extracted in S501.

In subsequent step S503, the CPU 21 checks whether the present time is within a maker guaranty period defined in the record read in in S502 (or S512). Then, if it is out of the maker guaranty period, in S504, the CPU 21 stores a URL to the dummy file in the "maker logo" field in the record read in in S502 (S512), and the processing proceeds to S505. Whereas if judging in S504 that the present time is within the maker guaranty period, the CPU 21 advances the processing directly to S505.

In S505, the CPU 21 checks whether the "maker logo" field in this record read in in S502 (or S512)is blank. Then, if the "maker logo" field is blank, in S506, the CPU 21 accesses the logo management server 40.

In next step S507, the CPU 21 obtains from the logo master table 64 of the logo management server 40 a URL to the logo data file of the maker identified by the maker identifying information contained in the record read in in S502 (or S512), an effective period of the maker logo and a URL to a Web page of the maker.

In next step S508, the CPU 21 checks whether a period ranging from the settlement date/time contained in the record read in in S502 (or S512) up to the present time is within the effective period of the maker logo obtained in S507. Then, if it is within the effective period, in S509, the CPU 21 registers the URL to the maker logo data file and the URL to the Web page obtained in S507 in the "maker logo" field and the "logo address" field in the record read in in S502 (or S512), and the processing proceeds to S511. On the other hand, when judging in S508 that it is out of the effective period, in S510, the CPU 21 stores a URL to a dummy file in the "maker logo" field in the record read in in S502 (or S512), and the processing proceeds to S511.

The CPU 21, when judging in S505 that the "maker logo" field in the record read in in S502 (or S512) is not blank, advances the processing directly to S511.

In S511, the CPU 21 checks whether there is an unprocessed record. Then, if there is an unprocessed record, the CPU 21 reads in S512 the unprocessed record, and the processing loops back to S503. Whereas if judging in S511 that there is not any unprocessed record, in S513, the CPU 21 generates data for displaying the third detailed statement screen on the basis of the settlement identification number specified in the request message, and the consumer identification number, the settlement date/time, all pieces of article information (the maker identifying information, the name of the article, the price, the maker guaranty period, the shop guaranty period) and the logo information (the URL to the logo data file and the URL to the Web page) which are contained in all the records containing the settlement identification number in the sales management database 91. FIG. 33 shows one example of this third detailed statement screen. As shown in FIG. 33, a detailed statement table 4a is shown in the third detailed statement screen. The detailed statement table 4a is formatted so that the respective lines are segmented by a "transaction date/time" field, a "slip code" field, an "abstract" field, a "maker guaranty period" filed and an "amount of money" field. A settlement date/time, a settlement identification number, and names and prices of the articles which constitute the article information are respectively entered in the "transaction date/time" field, the "slip code" field, the "abstract" field, the "maker guaranty period" filed and the "amount of money" field. Further, tool buttons that can be clicked are defined in boxes in the "maker guaranty period" field of the detailed statement table 4a. URLs to the maker logo data files as the logo information of those articles are embedded in these tool buttons so that maker logos of the articles are displayed on the tool buttons. Moreover, in case the URLs to the maker Web pages are stored as the logo information with respect to the articles, the URLs are set as hyperlinked URLs in these tool buttons defined in the boxes in the "maker guaranty period" field of the detailed statement table 4a. Further, a total of the prices of the articles that have been paid by the consumer at the shop, a total amount of value added taxes on these articles, a total including the prices and the value added taxes and a settlement date/time are also shown in the shop third detailed statement screen. Then, after generating the data for displaying the third detailed statement screen, the CPU 21 advances the processing to S514.

In S514, the CPU 21 transmits the generated data for displaying the third detailed statement screen to the consumer terminal 10' as the accessing side terminal and finishes the detailed statement notifying process.

The WWW Browser on the consumer terminal 10' receiving the data transmitted in accordance with the detailed statement notifying process displays the third detailed statement screen as shown in FIG. 33 on the display 10a. At this time, the WWW Browser accesses the logo management server 40 in accordance with the URL embedded in the tool button in the maker guaranty period" field, then obtains from the logo management server 40 the logo data file indicated by the file name contained in the URL, and pastes and displays an image based on the image data contained in the logo data file on the corresponding tool button. Note that if the file indicated by this file name is a dummy file, nothing or a dummy logo is displayed on the tool button.

As discussed above, according to the third embodiment, when receiving the shop logo information together with the settlement identification number and the settlement date/time from the credit company terminal 30', the consumer terminal 10' updates the calendar screen. Then, when this updated calendar screen is displayed on the display 10a, a shop logo might be shown in this calendar screen, and therefore the consumer is able to instantaneously grasp the settlement date by use of his or her credit card and the shop upon seeing the calendar screen.

Furthermore, when the consumer clicks the logo shown in the calendar screen, the data for displaying the third detailed statement screen are transmitted to the consumer terminal 10' from the shop terminal 20', and this third detailed statement screen is displayed on the display 10a. At this time, a logo of the maker manufacturing the article might be shown in the "maker guaranty period" field of the detailed statement table 4a on the third detailed statement screen, and the consumer is therefore able to instantaneously grasp the content of the transaction by seeing the third detailed statement screen.

Note that the present invention is not limited to only the embodiments discussed above. For instance, when the shop and maker logo information is obtained, the logos may be printed on a detailed statement sheet or on a detailed statement page of a bankbook on the basis of the logo information.

As discussed above, according to the present invention, the consumer can be notified of the detailed statement as the record of the transaction made by himself or herself in a state where it is easy to be visually confirmed.

We claim:

1. A detailed statement notifying method for transmitting information on a detailed statement about a transaction of an article between a consumer buying the article and a seller selling the article to a consumer terminal of the consumer, said method comprising:

storing transaction information on each transaction of the article between the consumer and the seller, said transaction information including identification information of a party concerned with the transaction;

determining that the present time is within a warrantee period for the article offered by a party whose identification information is included in the transaction information;

in response to the determination, obtaining logo information for showing a logo utilized by the party whose identification information is included in the transaction information;

generating detailed statement information for displaying the detailed statement of the transaction of the merchandise on a display of the consumer terminal, into which the logo information is incorporated so as to show the logo related to a content of the transaction information, based on the transaction information; and transmitting the detailed statement information to said consumer terminal.

2. A detailed statement notifying method according to claim 1, wherein the logo information includes information on a logo utilized by a maker of an article purchased by the consumer through the transaction.

3. A detailed statement notifying method according to claim 1, wherein the transaction information includes transaction information provided by a credit card company.

4. A detailed statement notifying method according to claim 1, wherein the transaction information includes article information provided by a party who makes the transaction with the consumer.

5. A detailed statement notifying method according to claim 1, further comprising obtaining the transaction information from a terminal of a party who makes the transaction with the consumer.

6. A detailed statement notifying method according to claim 1, wherein the logo information is obtained when a request is given from said consumer terminal.

7. A detailed statement notifying system for transmitting information on a detailed statement about a transaction of an article between a consumer buying the article and a seller selling the article to a consumer terminal of a consumer, said system comprising:

a storage unit storing transaction information on each transaction of the article between the consumer and the seller, said transaction information including identification information of a party concerned with the transaction;

a warrantee determination module determining that the present time is within a warrantee period for the article offered by a party whose identification information is included in the transaction information;

a logo information acquisition module, in response to the determination, obtaining logo information for showing a logo utilized by the party whose identification information is included in the transaction information;

a detailed statement generation module generating detailed statement information for displaying the detailed statement of the transaction of the merchandise on a display of the consumer terminal, into which the logo information that is stored in said storage unit is incorporated so as to show the logo related to a content of the transaction information, based on the transaction information; and a transmission module transmitting the detailed statement information generated by said detailed statement generation module to said consumer terminal.

8. A computer-readable medium stored with a detailed statement notifying program executed by a computer communicable with a consumer terminal of a consumer who makes a transaction regarding buying an article with a seller selling the article, to perform a method comprising:

storing transaction information on each transaction of the article between the consumer and the seller, the transaction information including identification information of a party concerned with the transaction;

determining that present time is within a warrantee period for the article offered by the party whose identification information is included in the transaction information;

in response to said determining, obtaining logo information for showing a logo utilized by the party whose identification information is included in the transaction information;

generating detailed statement information for displaying the detailed statement of the transaction of the merchandise on a display of the consumer terminal, into which the logo information is incorporated so as to show the logo related to a content of the transaction information, based on the transaction information; and transmitting the detailed statement information to the consumer terminal.

9. A detailed statement display method for displaying information about a transaction between a consumer buying an article and a seller selling the article, said method comprising:

storing transaction information on each transaction of the article between the consumer and the seller, the transaction information including identification information of a party concerned with the transaction;

determining that present time is within a warrantee period for the article offered by the party whose identification information is included in the transaction information;

in response to said determining, obtaining logo information for showing a logo utilized by the party whose identification information is included in the transaction information;

generating a detailed statement screen for the detailed statement of the transaction of the merchandise on a display of the consumer terminal, into which the logo information is incorporated so as to show the logo related to a content of the transaction information, based on the transaction information; and displaying the generated detailed statement screen.

* * * * *